(12) United States Patent
Kim

(10) Patent No.: US 9,229,354 B2
(45) Date of Patent: Jan. 5, 2016

(54) LUMINOUS FLUX LIMIT DEVICE, OPTICAL SCANNING UNIT EMPLOYING THE SAME, AND ELECTROPHOTOGRAPHIC IMAGE FORMING APPARATUS

(71) Applicant: Samsung Electronics Co., Ltd., Suwon-si, Gyeonggi-do (KR)

(72) Inventor: Wan-chin Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/314,695

(22) Filed: Jun. 25, 2014

(65) Prior Publication Data

US 2015/0009551 A1    Jan. 8, 2015

(30) Foreign Application Priority Data

Jul. 4, 2013 (KR) .......................... 10-2013-0078436

(51) Int. Cl.
| | |
|---|---|
| *G02B 26/02* | (2006.01) |
| *G03G 15/043* | (2006.01) |
| *G02B 27/00* | (2006.01) |
| *G02B 5/00* | (2006.01) |
| *G02B 26/12* | (2006.01) |
| *G02B 27/09* | (2006.01) |

(52) U.S. Cl.
CPC .............. *G03G 15/043* (2013.01); *G02B 5/005* (2013.01); *G02B 26/02* (2013.01); *G02B 26/12* (2013.01); *G02B 26/124* (2013.01); *G02B 27/0075* (2013.01); *G02B 27/0988* (2013.01); *G03G 15/0435* (2013.01)

(58) Field of Classification Search
CPC ......... B41J 2/435; G02B 26/02; G02B 26/08; G02B 27/0075; G03G 15/043
USPC ........................................ 347/256, 246, 224
See application file for complete search history.

(56) References Cited

U.S. PATENT DOCUMENTS

| | | | |
|---|---|---|---|
| 5,305,054 | A | 4/1994 | Suzuki et al. |
| 5,510,826 | A | 4/1996 | Koide |
| 2005/0046818 | A1 | 3/2005 | Neil et al. |
| 2006/0050409 | A1* | 3/2006 | George et al. ................ 359/708 |
| 2007/0146473 | A1* | 6/2007 | Masuda ........................ 347/246 |
| 2010/0097487 | A1* | 4/2010 | Marom et al. ............. 348/222.1 |

FOREIGN PATENT DOCUMENTS

| | | |
|---|---|---|
| JP | 9-243945 | 9/1997 |
| JP | 09243945 A * | 9/1997 |
| WO | 03/012528 A2 | 2/2003 |
| WO | 2008/129541 A2 | 10/2008 |

OTHER PUBLICATIONS

Extended European Search Report dated Oct. 23, 2014 in corresponding European Patent Application No. 14174053.0.

* cited by examiner

*Primary Examiner* — Sarah Al Hashimi
(74) *Attorney, Agent, or Firm* — Staas & Halsey LLP

(57) ABSTRACT

A luminous flux limit device, an optical scanning unit employing the luminous flux limit device, and an electrophotographic image forming apparatus are provided. The luminous flux limit device limits a luminous flux of the optical scanning unit and includes a light-blocking portion, a light transmissive region around the light blocking region, and a light blocking outer region around the light transmissive region.

22 Claims, 17 Drawing Sheets

LUMINOUS FLUX LIMIT DEVICE, OPTICAL SCANNING UNIT EMPLOYING THE SAME, AND ELECTROPHOTOGRAPHIC IMAGE FORMING APPARATUS

CROSS-REFERENCE TO RELATED APPLICATIONS

This application is related to, and claims the priority benefit of Korean Patent Application No. 10-2013-0078436, filed on Jul. 4, 2013, in the Korean Intellectual Property Office, the disclosure of which is incorporated herein in its entirety by reference.

BACKGROUND

1. Field

One or more embodiments relate to a luminous flux limit device, an optical scanning unit including the luminous flux limit device, and an electrophotographic image forming apparatus.

2. Description of the Related Art

An electrophotographic image forming apparatus, such as a laser printer, a digital copy machine, or a multi-functional printer (MFP), has a structure configured to form an electrostatic latent image by scanning light on a photosensitive body via an optical scanning unit, develop the electrostatic latent image into a developed image by using a developer such as toner, and transfer the developed image onto a printing medium.

Optical scanning units for use in electrophotographic image forming apparatuses may be required to have a high-definition image formation property. Furthermore, a larger tolerance of an error of an arrangement of a photosensitive body disposed near an image-forming region may be required.

In optical scanning units for use in electrophotographic image forming apparatuses, a desired optical beam spot has been achieved in an image-forming region by arranging a luminous flux limit device having an appropriate-sized optical aperture in main and sub scanning directions before a luminance flux is incident on a deflector. An optical aperture of a general luminous flux limit device may have a circular, oval, or tetragonal shape, and may not have a structure that transforms a transmission amplitude and phase of a luminous flux. When a general optical aperture is used, a wavelength of an optical system may be reduced or a numerical aperture (NA) of the optical system may be increased to increase a resolution on an image-forming surface. However, since the depth of focus of the optical system is inversely proportional to the square of the NA, the depth of focus decreases when the NA increases. Thus, an allowed tolerance of the arrangement of a photosensitive body in a focal region decreases.

SUMMARY

One or more embodiments include a luminous flux limit device capable of improving the resolution in a focal region and securing a sufficient tolerance of an optical depth without increasing manufacturing costs of an optical scanning unit, an optical scanning unit employing the luminous flux limit device, and an electrophotographic image forming apparatus Additional aspects will be set forth in part in the description which follows and, in part, will be apparent from the description, or may be learned by practice of the presented embodiments.

According to one or more embodiments, a luminous flux limit device that limits a luminous flux of an optical scanning unit includes a body portion including an aperture; and a light-blocking portion to prevent light from being transmitted via a portion of the aperture. The aperture includes a blocking region in which light is blocked by the light-blocking portion; and a transmissive region which is a remaining region of the aperture excluding the blocking region.

The blocking region may be located in a central region of the aperture, and the transmissive region may surround the blocking region.

An outermost shape of the transmissive region may be one of a circular shape, an oval shape, and a tetragonal shape. An outermost shape of the blocking region may be one of a circular shape, an oval shape, and a tetragonal shape.

An outermost shape of the transmissive region and an outermost shape of the blocking region are different from each other. For example, the outermost shape of the transmissive region may be a circular shape and outermost shape of the blocking region may be an oval or tetragonal shape. The outermost shape of the transmissive region may be an oval shape and outermost shape of the blocking region may be a circular or tetragonal shape. The outermost shape of the transmissive region may be a tetragonal shape and outermost shape of the blocking region may be a circular or oval shape. The outermost shape of the transmissive region may be an oval shape and outermost shape of the blocking region may be a circular shape.

An outermost shape of the transmissive region may be a first oval shape, an outermost shape of the blocking region may be a second oval shape, and a major axis of the first oval shape and a major axis of the second oval shape may be located in different directions. The major axis of the first oval shape may be located in a sub scanning direction, and the major axis of the second oval shape may be located in a main scanning direction. The major axis of the first oval shape may be located in a main scanning direction, and the major axis of the second oval shape may be located in a sub scanning direction.

An outermost shape of the transmissive region may be a first oval shape, an outermost shape of the blocking region may be a second oval shape, and the first oval shape and the second oval shape may have different eccentricities.

Widths of diameters of the transmissive region in a main scanning direction and a sub scanning direction may be different from each other.

An outermost shape of the transmissive region and an outermost shape of the blocking region may be the same. For example, the transmissive region may include a first transmissive region and a second transmissive region, the phases of the luminous fluxes of which are set to be different. The outermost shape of the transmissive region and the outermost shape of the blocking region may be oval shapes having the same eccentricity, the same major axis direction, and the same minor axis direction.

The transmissive region may include a first transmissive region and a second transmissive region, wherein a phase difference are set between the phase of the luminous flux passing through the second transmissive region and the phase of the luminous flux passing through the first transmissive region. The first transmissive region may surround the blocking region, and the second transmissive region may surround the first transmissive region. A phase difference may be set in the transmissive region to minimize bad influences caused by sidelobe, and to prevent degradation in resolution and minimize an optical loss caused by the blocking region even when the size of the blocking region is reduced.

An outermost shape of the blocking region, an outermost shape of the first transmissive region, and an outermost shape of the second transmissive region may be the same.

At least two among an outermost shape of the blocking region, an outermost shape of the first transmissive region, and an outermost shape of the second transmissive region may be different from each other.

If a radius of an outermost portion of the blocking region in a main scanning direction is $\rho_{1m}$, a radius of an outermost portion of the first transmissive region in the main scanning direction is $\rho_{2m}$, and a radius of an outermost portion of the second transmissive region in the main scanning direction is $\rho_{3m}$, then $\rho_{1m} < \rho_{2m} < \rho_{3m}$, $0.3 \leq \rho_{1m}/\rho_{3m} \leq 0.7$, and $0.5 \leq \rho_{2m}/\rho_{3m} \leq 0.9$ may be satisfied. If a radius of an outermost portion of the blocking region in a sub scanning direction is $\rho_{1s}$, a radius of an outermost portion of the first transmissive region in the sub scanning direction is $\rho_{2s}$, and a radius of an outermost portion of the second transmissive region in the sub scanning direction is $\rho_{3s}$, then $\rho_{1s} < \rho_{2s} < \rho_{3s}$, $0.3 \leq \rho_{1s}/\rho_{3s} \leq 0.7$, and $0.5 \leq \rho_{2s}/\rho_{3s} \leq 0.9$ may be satisfied.

If a radius of an outermost portion of the blocking region in a main scanning direction is $\rho_{1m}$, a radius of an outermost portion of the blocking region in a sub scanning direction is $\rho_{1s}$, a radius of an outermost portion of the transmissive region in the main scanning direction is $\rho_{2m}$, and a radius of an outermost portion of the transmissive region in the sub scanning direction is $\rho_{2s}$, then $0.3 \leq \rho_{1m}/\rho_{2m} \leq 0.7$, and $0.3 \leq \rho_{1s}/\rho_{2s} \leq 0.7$ may be satisfied.

The body portion may be a transparent substrate, and the light-blocking portion may be formed on the transparent substrate. For example, the light-blocking portion may be formed on the transparent substrate by one or two methods selected from the group of plating, anodizing, sputtering, and e-beam evaporation.

The aperture in the body portion may be a hole, and the light-blocking portion may be supported by a support portion that is extended from an edge of the aperture. If a width of the support portion is d and a radius of an outermost portion of the transmissive region is $\rho$, then $0 < d/\rho \leq 0.3$ may be satisfied. The body portion and the light-blocking portion may be integrally formed. For example, the body portion and the light-blocking portion may be integrally formed by pressing or injection molding One or more embodiments include an optical scanning apparatus includes a light source for emitting light according to an image signal; a deflector for deflection-scanning a luminous flux emitted from the light source; an incident optical system for causing the luminous flux emitted from the light source to be incident on the deflector; and an image forming optical system for imaging the luminous flux deflected by the deflector on an image-formed surface. The incident optical system includes a luminous flux limit device for limiting the luminous flux. The luminous flux limit device includes a body portion including an aperture; and a light-blocking portion to prevent light from being transmitted via a portion of the aperture. The aperture includes a blocking region in which light is blocked by the light-blocking portion; and a transmissive region which is a remaining region of the aperture excluding the blocking region.

The incident optical system may further include a collimator lens for collimating a luminous flux emitted from the light source into a collimated beam; and a cylindrical lens for causing the luminous flux passing through the collimator lens to be focused on a reflecting surface of the deflector in a main scanning direction or a sub scanning direction. The luminous flux limit device may be disposed in an optical path between the collimator lens and the cylindrical lens.

One or more embodiments include an electrophotographic image forming apparatus includes an image carrier; an optical scanning unit for forming an electrostatic latent image by scanning a light beam on an image-formed surface of the image carrier; and a developing device for developing the electrostatic latent image formed on the image carrier by supplying toner to the electrostatic latent image.

An optical scanning unit employing a luminous flux limit device and an electrophotographic image forming apparatus according to embodiments set forth herein are capable of improving depth characteristics in a focal region while improving a resolution.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
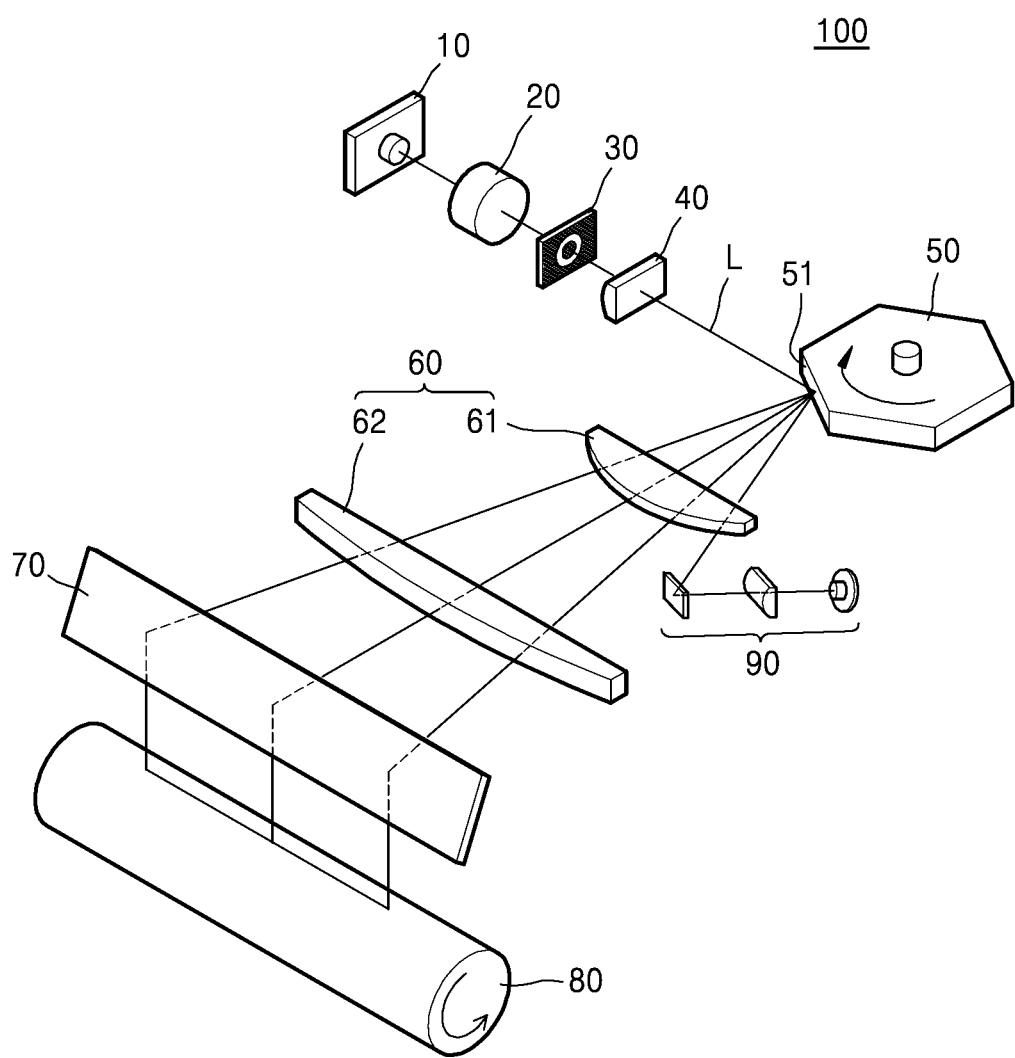
FIG. 1 schematically illustrates an optical scanning unit according to an embodiment.

Reference will now be made in detail to embodiments, examples of which are illustrated in the accompanying drawings, wherein like reference numerals refer to like elements throughout. In the drawings, the size or thickness of layers and regions may be exaggerated for clarity. In this regard, the present embodiments may have different forms and should not be construed as being limited to the descriptions set forth herein. Accordingly, the embodiments are merely described below, by referring to the figures, to explain aspects of the present description.

FIG. 1 schematically illustrates an optical scanning unit 100 according to an embodiment.

Referring to FIG. 1, the optical scanning unit 100 includes a light source 10 that emits a light beam L. A laser diode may be the light source 10. The light source 10 may emit the light beam L that is modulated according to an image signal.

The light beam L emitted from the light source 10 may be scanned by being deflected by a deflector 50. The deflector 50 may be, for example, a rotating polygon mirror having a plurality of reflecting surfaces that rotate with respect to a rotation axis at a uniform speed, i.e., deflecting surfaces 51. The deflector 50 may be a micro-electromechanical systems (MEMS) mirror.

An incident optical system may be disposed in an optical path between the light source 10 and the deflector 50. The incident optical system may include a luminous flux limit device 30 that limits the luminous flux of the light beam L. The incident optical system may include a collimator lens 20 and a cylindrical lens 40. The collimator lens 20 is a condenser that collimates the light beam L emitted from the light source 10 into a parallel beam or a convergent beam. The luminous flux limit device 30 may be disposed after the collimator lens 20 to limit the luminous flux of the light beam L that is collimated into the parallel or convergent beam. The cylindrical lens 40 may be disposed after the luminous flux limit device 30. The cylindrical lens 40 is an anamorphic lens that substantially linearly focuses the light beam L on a deflecting surface 51 of the deflector 50 by focusing the light beam L to be linearly long in a sub scanning direction. The cylindrical lens 40 may focus the light beam L to be linearly long in a main scanning direction according to the design of the optical system.

An image forming optical system 60 may be disposed in an optical path between the deflector 50 and a photosensitive drum 80. The photosensitive drum 80 is an example of an image carrier having an image-formed surface. The image forming optical system 60 focuses the light beam L that is deflection-scanned by the deflector 50 on the image-formed surface of the photosensitive drum 80. The image forming optical system 60 may include one or more toric lenses each having an fθ feature that corrects the light beam L to be converged and scanned on the image-formed surface at a uniform speed. For example, the image forming optical system 60 may include a first scanning optical device 61 and a second scanning optical device 62. The first scanning optical device 61 may be designed to have a positive refractive power in the main scanning direction and have a refractive power that is substantially zero in the sub scanning direction, and the second scanning optical device 62 may be designed to have a refractive power that is substantially required in the sub scanning direction in the image forming optical system. A reflective mirror 70 configured to appropriately change an optical path may be disposed in the image forming optical system 60 or between the image forming optical system 60 and the photosensitive drum 80.

A synchronization detection optical system 90 may be prepared to detect a signal that is synchronized with the light beam L that is deflection-scanned by the deflector 50. The synchronization detection optical system 90 may include a synchronization detection lens that collimates a starting end of the light beam L that is deflection-scanned by the deflector 50 and a synchronization detection sensor detecting the starting end of the light beam L.

Figure 2:
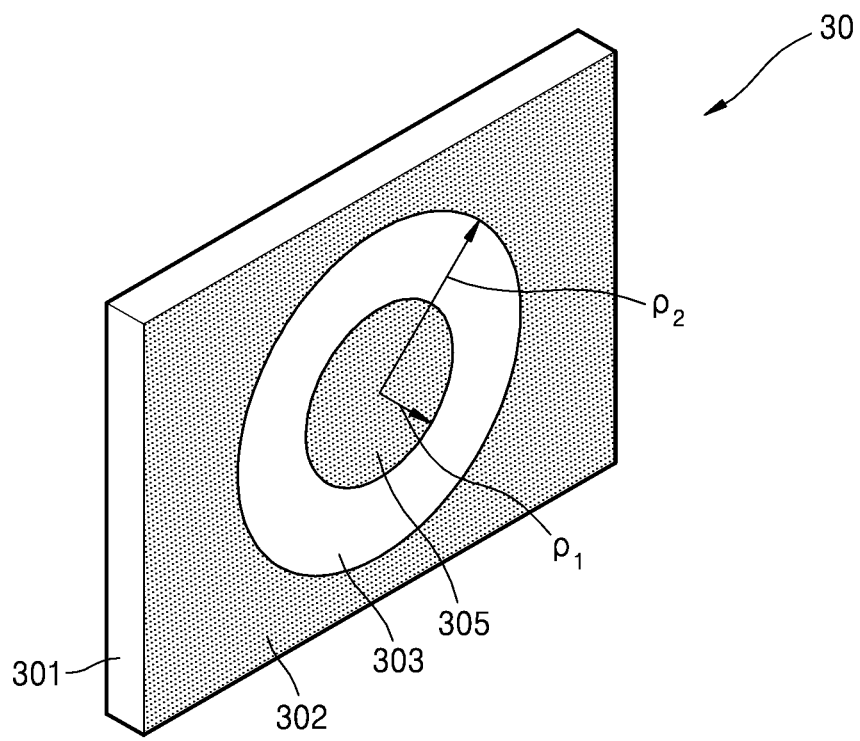
FIG. 2 is a schematic perspective view of a luminous flux limit device employed in an optical scanning unit.

FIG. 2 is a schematic perspective view of a luminous flux limit device 30 in an optical scanning unit 100.

Referring to FIG. 2, the luminous flux limit device 30 is a device that limits a cross-section (i.e., diameter and shape) of a luminous flux of a light beam L to form a desired beam spot. The luminous flux limit device 30 may include a circular blocking region 305 at a center thereof, and a transmissive region 303 having a circular band shape surrounding the blocking region 305. In the luminous flux limit device 30, an outer region 302 of the transmissive region 303 and the blocking region 305 may be manufactured by forming a light-blocking portion on a light-incident surface or a light-exit surface of a transparent substrate 301. For example, the light-blocking portion may be formed on the transparent substrate 301 by using at least two methods among plating, anodizing, sputtering, and e-beam evaporation.

Both outermost portions of the transmissive region 303 and the blocking region 305 may have a circular shape. That is, the luminous flux limit device 30 according to an embodiment is a cylindrical type device in which the sizes of an aperture in the main scanning direction and the sub scanning direction are the same. If a radius of the outermost portion of the blocking region 305 is $\rho_1$ and a radius of the outermost portion of the transmissive region 303 is $\rho_2$, the radii $\rho_1$ and $\rho_2$ of the outermost portions of the blocking region 305 and the transmissive region 303 may be determined by a required resolution and focus of depth on an image forming surface. The greater the size of the blocking region 305, the higher the resolution, but a light intensity of a first side-lobe increases in this case. The higher the blocking ratio of the luminous flux limit device 30, the less the amount of light is transmitted to the image forming surface. Thus, the blocking ratio of the luminous flux limit device 30 may be determined in consideration of both the light efficiency and an effect of improving image-forming features. Thus, the blocking region 305 and the transmissive region 303 of the luminous flux limit device 30 according to an embodiment may be formed to satisfy Equation 1 below.

$$0.3 \le \frac{\rho_1}{\rho_2} \le 0.7 \qquad \text{[Equation 1]}$$

Figure 3:
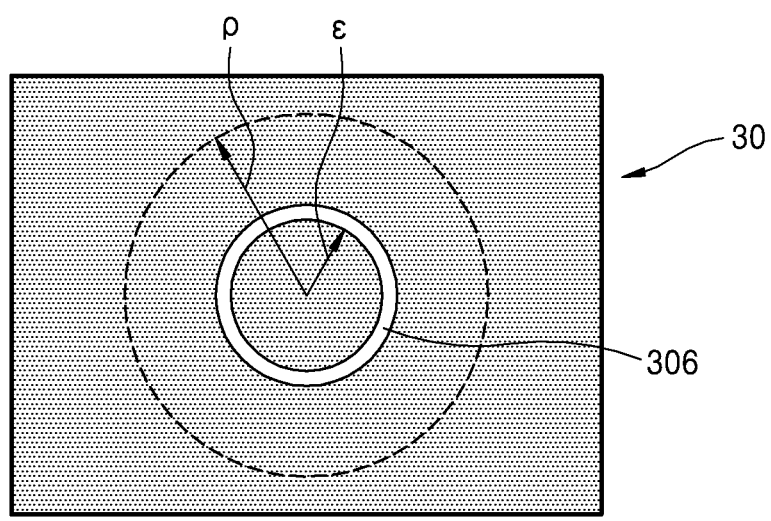
FIG. 3 schematically illustrates an exemplary operation of a luminous flux limit device.
Figure 4:
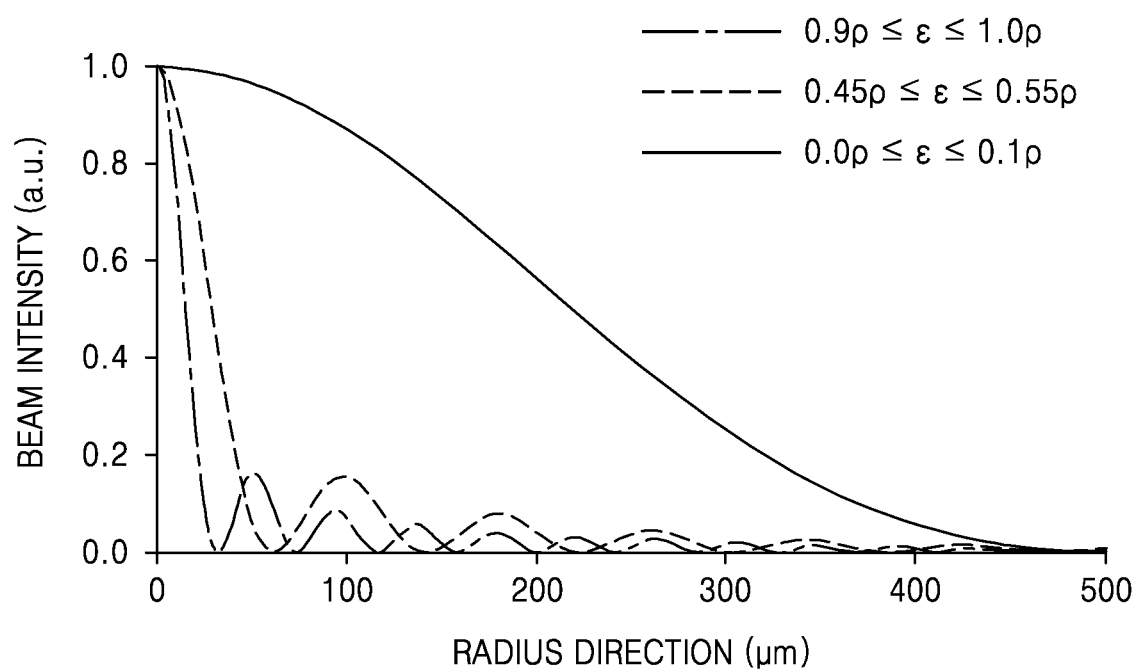
FIG. 4 is a graph schematically illustrating an exemplary distribution of beam intensities on an image forming surface according to a location of a transmissive region in a luminous flux limit device.

The relationship between the sizes of the transmissive region 303 and the blocking region 305 are illustrated, for example, in FIGS. 3 and 4.

FIG. 3 schematically illustrates an exemplary operation of the luminous flux limit device 30. FIG. 4 is a graph schematically illustrating an exemplary distribution of beam intensities on an image forming surface according to the location of the transmissive region 303 in the luminous flux limit device 30 according to an embodiment.

Referring to FIG. 3, if a radius and a maximum radius of a position relative to an aperture 306 of the luminous flux limit device 30 are "ϵ" and "ρ", the transmissive region 303 may be expressed with a range of ϵ. Referring to FIG. 4, when light passes through only a central portion of the luminous flux limit device 30 that satisfies $0.0\rho \leq \epsilon \leq 0.1\rho$, the beam intensity of a light beam gently decreases in a direction of the radius of the beam intensity of a light beam. When the transmissive region 303 satisfies $0.45\Sigma \leq \epsilon \leq 0.55\rho$, a main spot of the light beam is formed to have a radius of about 0 to about 60 μm in the radius direction, and a first side-lobe is formed to have a radius of about 60 to 140 μm in the radius direction. When the transmissive region 303 satisfies $0.9\rho \leq \epsilon \leq 1.0\rho$, a main spot may be formed to have a radius of about 0 to about 40 μm in the radius direction and a first side-lobe may be formed to have a radius of about 40 to about 80 μm in the radius direction. That is, light passing through an outer region of the transmissive region 303 forms on an image forming surface a beam spot having a diameter that is less than that of a beam formed by light passing through an inner portion of an effective region of an optical aperture. When light passing through the transmissive region 303 passes a position that is distant from the center of the aperture toward an outer side, a propagation vector has a high-frequency component. Thus, a resolution of an optical system increases when the light intensity of light having the high-frequency propagation vector is high on the image forming surface. That is, FIG. 4 illustrates a variation in a resolution on the image forming surface according to the location of transmitted light in an effective optical aperture region when a circular optical aperture is used.

As illustrated in FIG. 4, the farther a region through which light passes is distant from the center of the luminous flux limit device 30, the higher the resolution on the image forming surface. Thus, the resolution on the image forming surface may be improved by blocking a luminous flux passing through a central portion of the luminous flux limit device 30 and allowing a light beam to pass through only the transmissive region 303 that is distant from the center of the luminous flux limit device 30, as shown in Equation 1.

Figure 5:
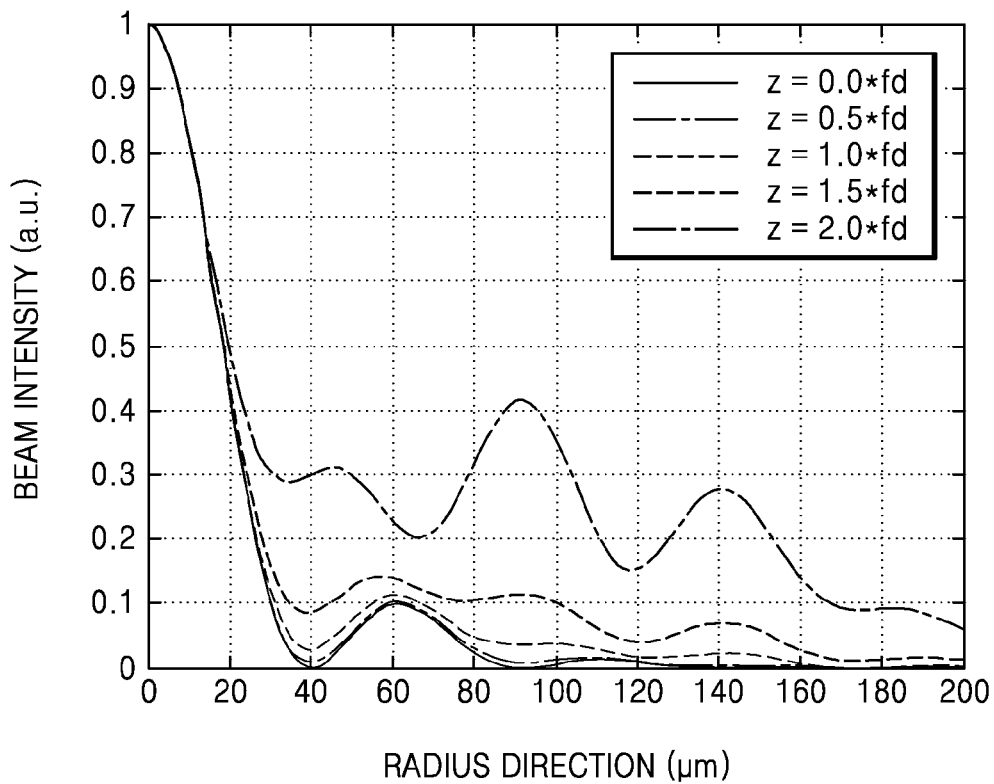
FIG. 5 is a graph illustrating an exemplary distribution of light intensities on an image forming surface in a luminous flux limit device.
Figure 6:
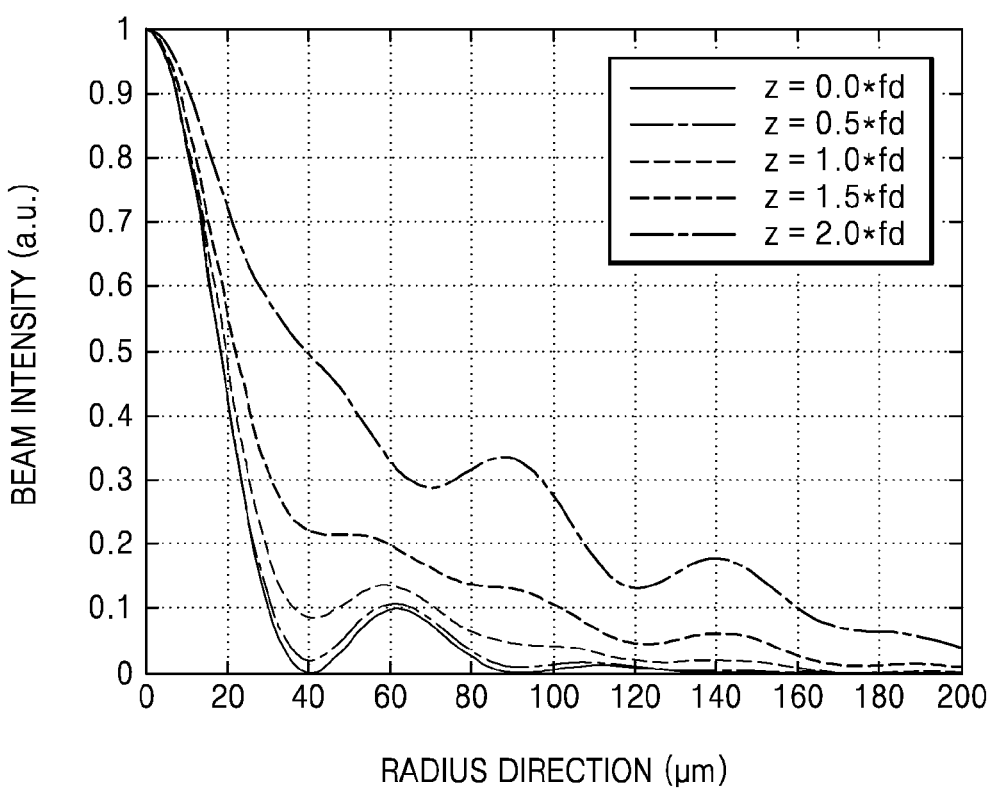
FIG. 6 is a graph illustrating an exemplary distribution of light intensities on an image forming surface in a luminous flux limit device.

FIG. 5 is a graph illustrating an exemplary distribution of light intensities on an image forming surface in the luminous flux limit device 30. FIG. 6 is a graph illustrating an exemplary distribution of light intensities on an image forming surface in a luminous flux limit device. FIGS. 5 and 6 illustrate distributions of beam intensities in a radius direction when z=0.0*fd (when a beam is focused on the image forming surface) and when z=0.5*fd, z=1.0*fd, z=1.5*fd, and z=2.0*fd (when a beam is not focused on the image forming surface).

The graph of FIG. 5 was obtained when the blocking region 305 of the luminous flux limit device 30 satisfies $0.0\rho \leq \epsilon \leq 0.5\rho$, the transmissive region 303 satisfies $0.5\rho \leq \epsilon \leq 1.0\rho$, and main and sub scanning F/# of the image forming optical system 60 are "40". The comparative example of FIG. 6 illustrates a case in which the luminous flux limit device does not include a blocking region, i.e., when the luminous flux limit device has a simple circular aperture shape.

In an optical system, a length of a focal depth on an image forming region is proportional to a wavelength and is inversely proportional to the square of a numeral aperture (NA) of the luminous flux limit device 30. In an embodiment of FIG. 5, the size of an outermost portion of an aperture, i.e., the size of an outermost portion of the transmissive region 303, is not changed and thus a resolution hardly changes according to the location of an image forming region in a direction of an optical axis. In contrast, in the comparative example of FIG. 6, the entire region of an aperture of the luminous flux limit device is used as a transmissive region of a light beam and thus a resolution greatly changes according to the location of an image forming region in a direction of an optical axis. That is, as illustrated in FIG. 5, when an optical aperture of the luminous flux limit device 30 corresponding to a low-frequency region of the image forming region is appropriately blocked by setting the blocking region 305 to satisfy $0.0\rho \leq \epsilon \leq 0.5\rho$, the resolution is improved by about 10% and a tolerance of an optical depth in the image forming region increases twice or more, compared to the comparative example of FIG. 6.

The optical characteristics of the luminous flux limit device 30 according to an embodiment may be understood as described below. A maximum light intensity induced in a focal region by a luminous flux passing through a central region of an optical aperture does not sharply change in the focal region in a direction of an optical axis. Thus, when a luminous flux passing through a transmissive region on the optical aperture in a radius direction is linearly added to the image forming region, the farther the luminous flux is from a geometrical optic image forming location in a direction of an optical axis, the more important the intensity of light passing through a central region of the optical aperture becomes, compared to light passing through an external region. Although the size of a vertical component of an electromagnetic wave vibrating near the geometrical optic image forming location in a direction perpendicular to an optical axis may be more important and a component of the electromagnetic wave vibrating in the direction of the optical axis may be less important, the farther the electromagnetic wave is from the geometrical optical image forming location in the direction of the optical axis, the importance of the component of the electromagnetic wave vibrating in the direction of the optical axis gradually increases. Accordingly, when an incident luminous flux causing a relatively low resolution on the image-forming region (i.e., a luminous flux passing through the central region of the optical aperture) among lights passing through the optical aperture is blocked as in the present embodiment, the resolution on the image forming region may be improved and a sufficient depth tolerance in a focal region may be secured, compared to a related art.

Although the amount of a primary side-lobe component in the embodiment of FIG. 5 is greater by about 10% than in the comparative example of FIG. 6, degradation in image-forming characteristics due to this problem may be easily prevented by controlling exposure sensitivity in the photosensitive drum 80.

Figure 7:
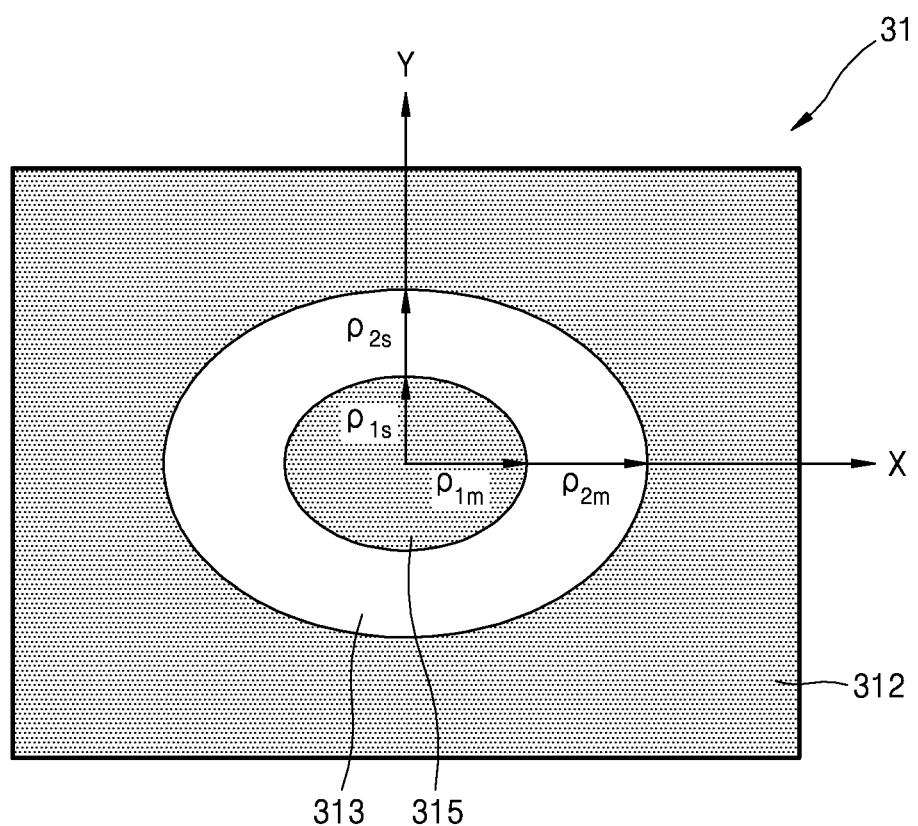
FIG. 7 schematically illustrates a luminous flux limit device according to an embodiment.

FIG. 7 schematically illustrates a luminous flux limit device 31 according to an embodiment. In FIG. 7, the X-axis denotes a main scanning direction and the Y-axis denotes a sub scanning direction. A main scanning direction X may be defined as a direction in which the light beam L of FIG. 1 is deflected by rotation of the deflector 50 of FIG. 1. Thus, the main scanning direction X is perpendicular to a rotational axis of the deflector 50. The main scanning direction X of the light beam L that has yet to be incident on the deflector 50 may be defined as a direction perpendicular to both the propagation direction of the light beam L and the rotational axis of the deflector 50. The sub scanning direction Y may be defined as a direction perpendicular to both the propagation direction of the light beam L and the main scanning direction X. The sub scanning direction Y corresponds to a direction in which an image-formed surface is moved by rotation of the photosensitive drum 80 of FIG. 1.

The luminous flux limit device 31 according to an embodiment may include an oval blocking region 315 located in a central region thereof, and an transmissive region 313 having an oval band shape surrounding the blocking region 315. This embodiment also indicates an outer region 312. Both outermost portions of the transmissive region 313 and the blocking region 315 may have oval shapes having the same eccentricity, the same major axis direction, and the same minor axis direction. The luminous flux limit device 31 according to an embodiment may be applied when the main and sub scanning magnifications of an optical system disposed after the luminous flux limit device 31 are different. In other words, the luminous flux limit device 31 according to an embodiment may be applied when the sizes of a beam spot required on an image-formed surface in the main scanning direction X and the sub scanning direction Y are different.

If a radius of an outermost portion of the blocking region 315 in the main scanning direction X is "$\rho_{1m}$", a radius of an outermost portion of the blocking region 315 in the sub scanning direction Y is "$\rho_{1s}$", a radius of an outermost portion of the transmissive region 313 in the main scanning direction X is "$\rho_{2m}$", and a radius of an outermost portion of the transmissive region 313 in the sub scanning direction Y is "$\rho_{2s}$", then the radii $\rho_{1m}$ and $\rho_{1s}$ of the outermost portions of the blocking region 315 and the radii $\rho_{2m}$ and $\rho_{2s}$ of the outermost portions of the transmissive region 313 may be determined by a resolution and focal depth required on an image forming surface. The larger the blocking region 315, the higher the resolution, but the higher a light intensity of a primary side-lobe. The higher a blocking ratio of the luminous flux limit device 31, the less the amount of light is delivered to the image forming surface. Thus, the blocking ratio of the luminous flux limit device 31 may be determined in consideration of both an optical efficiency and an improvement in image-forming characteristics. Accordingly, the blocking region 315 and the transmissive region 313 of the luminous flux limit device 31 according to an embodiment may be formed to satisfy Equation 2 below.

$$0.3 \leq \frac{\rho_{1m}}{\rho_{2m}} \leq 0.7, \ 0.3 \leq \frac{\rho_{1s}}{\rho_{2s}} \leq 0.7 \quad \text{[Equation 2]}$$

As illustrated in FIG. 7, oval major and minor axes of the luminous flux limit device 31 may be located in the main scanning direction X and the sub scanning direction Y, respectively. High-frequency components may be sufficiently secured and low-frequency components are suppressed in a light beam on the image forming surface in the main scanning direction X, thereby increasing a resolution in the main scanning direction X and suppressing a side-lobe in the sub scanning direction Y. When a resolution in the sub scanning direction Y needs to be more secured according to a need in optical design, the oval major and minor axes of the luminous flux limit device 31 may be set to be located in the sub scanning direction Y and the main scanning direction X, respectively.

For example, if an optical aperture is configured in an oval shape, the lengths of an aperture in the main and sub scanning directions X and Y are $\rho_m$ and $\rho_s$, main and sub scanning magnifications of the optical system are $M_m$ and $M_s$, a main scanning F/# and a sub scanning F/# on an image forming surface are $FNO_m$ and $FNO_s$, then Equation 3 below is obtained.

$$\frac{\rho_m}{\rho_s} \cong \frac{M_m}{M_s} \cdot \frac{FNO_s}{FNO_m} \quad \text{[Equation 3]}$$

For example, if design specifications of the main scanning F/# FNOm and the sub scanning F/# FNOs on the image forming surface are 58.4 and 63, a main scanning magnification Mm is 12.4, and a sub scanning magnification Ms is 7.0, then a right side of Equation 3 has a value of 1.9. The relationship between the major axis and the minor axis of the oval aperture satisfies $\rho_m \approx 1.9 \rho_s$. When amplitude modulation is performed such that light is blocked in a region, the radius of which is less than $0.5 \rho_m$ in the major axis direction and is less than $0.5 \rho_s$ in the minor axis direction and is allowed to pass through the other regions (that is, when $\rho_{1m}=0.5\rho_m$, $\rho_{2m}=\rho_m$, $\rho_{1s}=0.5\rho_s$, and $\rho_{12s}=\rho_s$), an image-forming resolution and image-forming forming depth characteristics may be improved as described above. When different beam spot profiles are required on the image forming surface in the main scanning direction X and the sub scanning direction Y (for example, when improved image-forming characteristics are required in the sub scanning direction Y and small side-lobe characteristics of a beam profile are required in the main scanning direction X), the radii $\rho_{1m}$ and $\rho_{1s}$ may be set to different values.

Figure 8A:
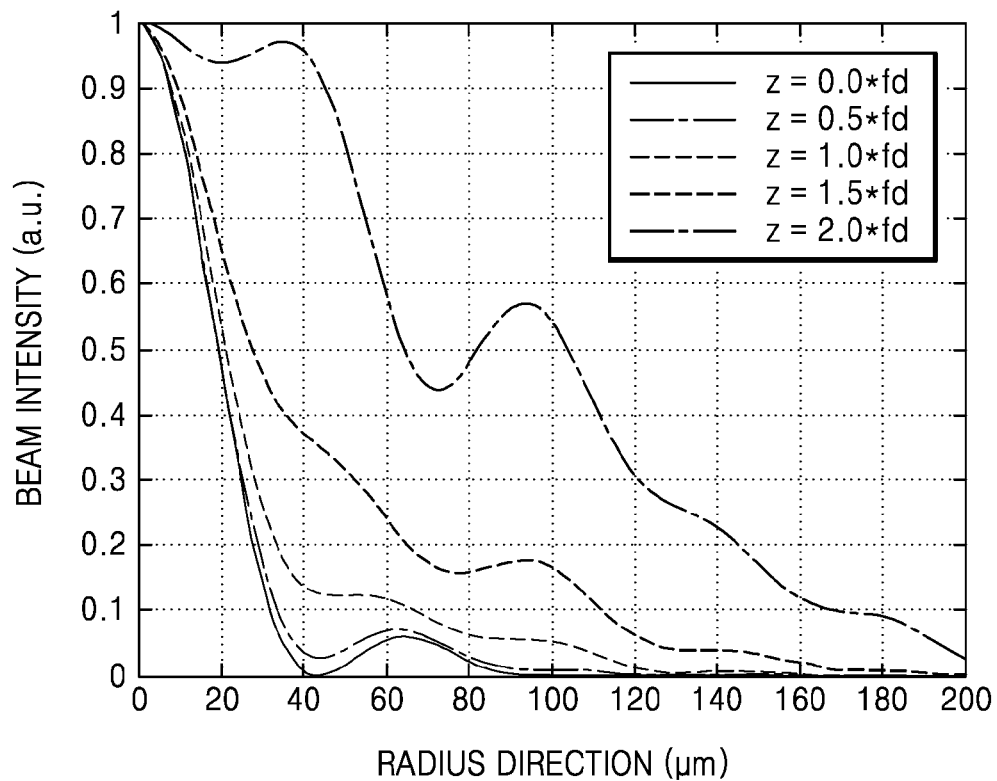
FIGS. 8A to 8C are graphs illustrating exemplary distribution of light intensities on an image forming surface according to the size of a blocking region in a luminous flux limit device.
Figure 8B:
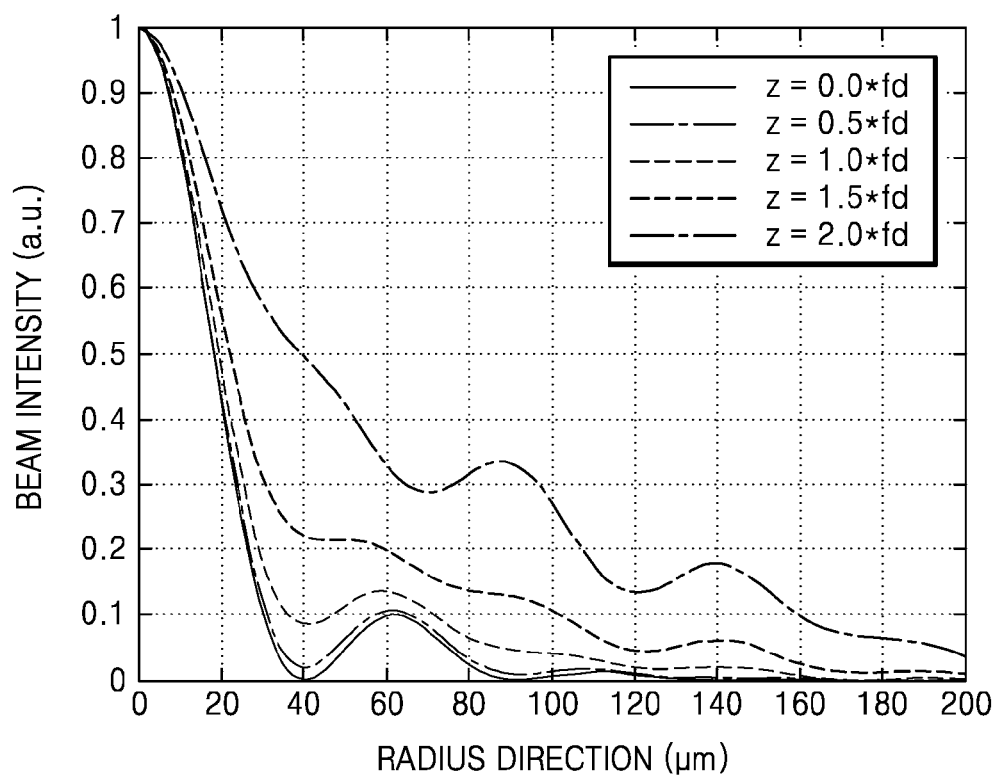
Figure 8C:
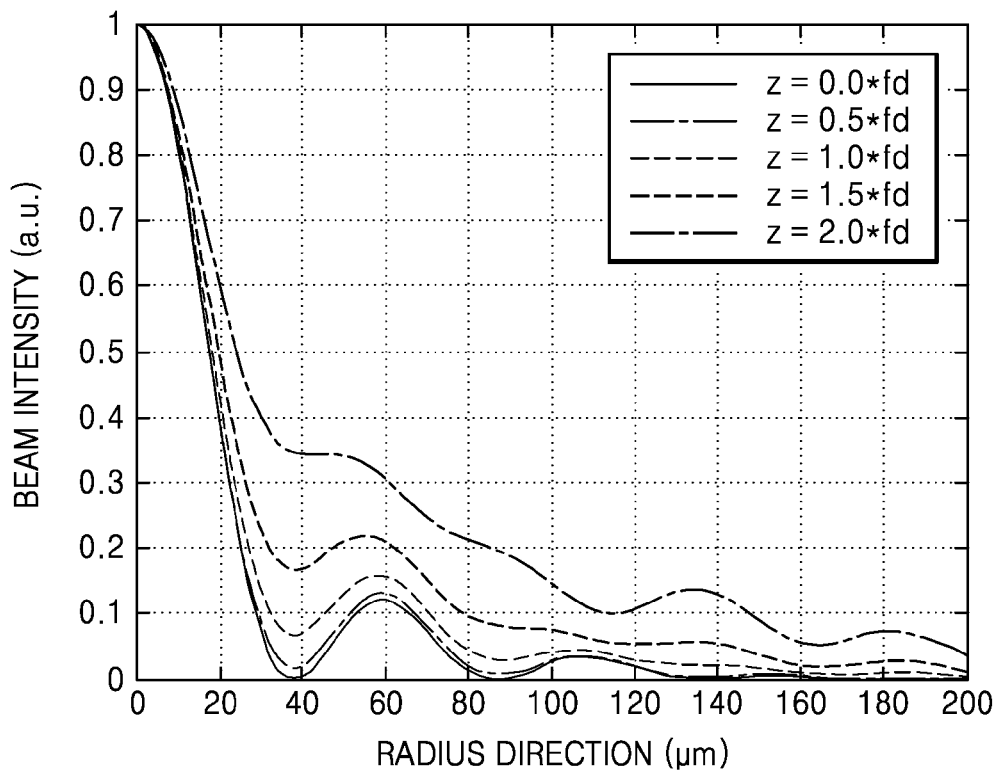
Figure 9:
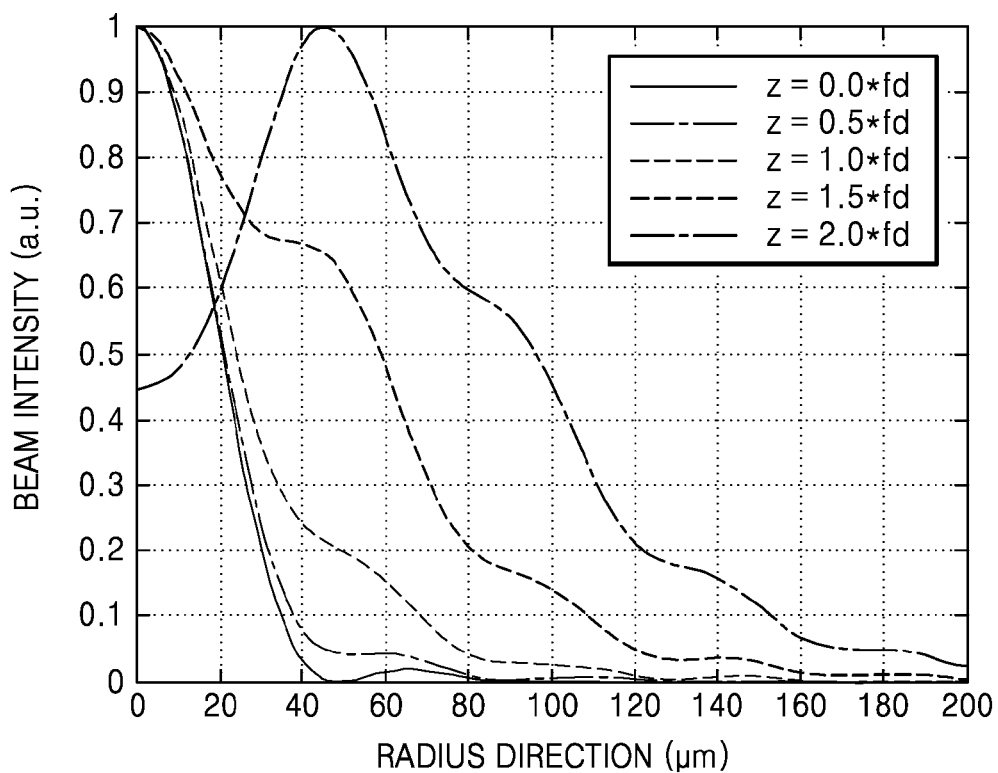
FIG. 9 is a graph illustrating an exemplary distribution of light intensities on an image forming surface in a luminous flux limit device.

FIGS. 8A to 8C are graphs illustrating an exemplary distribution of light intensities on an image forming surface according to the size of the blocking region 315 in the luminous flux limit device 31 of FIG. 7. FIG. 9 is a graph illustrating an exemplary distribution of light intensities on an image forming surface in a luminous flux limit device.

FIGS. 8A to 8C and 9 illustrate distributions of light intensities when z=0.0*fd (when a beam is focused on an image forming surface) and when z=0.5*fd, z=1.0*fd, z=1.5*fd, and z=2.0*fd (when a beam is not focused on the image forming surface). The graphs of FIGS. 8A to 8C illustrate cases in which the ratio of the size of a blocking region to the size of an entire aperture region of the blocking region 315 of the luminous flux limit device 31 is 35%, 50%, and 60%, respectively. The exemplary graphs of FIGS. 8A to 8C were obtained when a main scanning magnification and sub scanning magnification of an optical system disposed after the luminous flux limit device 31 are different and a main scanning F/# and sub scanning F/# of the image-forming optical system 60 are 40. The comparative example of FIG. 9 illustrates a case in which the luminous flux limit device does not include a blocking region, i.e., when the luminous flux limit device has a simple oval aperture shape.

Referring to FIGS. 8A to 8C, the higher a blocking ratio of the blocking region 315 of the luminous flux limit device 31, the greater a change in the location of an optical axis in an image-forming region, the less a change in the distribution of light intensities, but the higher a light intensity of a primary side-lobe. The higher the blocking ratio of the luminous flux limit device 31, the less the amount of light is delivered to the image forming surface. Thus, the blocking ratio of the luminous flux limit device 31 may be determined in consideration of both an optical efficiency and an improvement in image-forming characteristics As illustrated in FIGS. 8A to 8C, according to an embodiment, the size of an outermost portion of an aperture, i.e., the size of an outermost portion of the transmissive region 313, is not changed. Thus, a resolution hardly changes according to the location of an optical axis on the image-forming region. As illustrated in FIG. 9, an entire aperture region of the luminous flux limit device may be used as a transmissive region of a light beam and thus a resolution greatly changes according to the location of an image-forming region in a direction of an optical axis. For example, as illustrated in FIG. 8B, when a blocking ratio of the blocking region 315 is set to about 50%, a resolution is increased by about 10% and a tolerance of an optical depth in an image-forming region is secured to be twice or more, compared to an embodiment illustrated in FIG. 9.

FIGS. 10 to 14 schematically illustrate luminous flux limit devices 32, 33, 34, 35, and 36 according to exemplary embodiments. As illustrated in FIGS. 10 to 14, in each of the luminous flux limit devices 32, 33, 34, 35, and 36, outermost shapes of a transmissive region and a blocking region may be different. As illustrated in FIGS. 10 to 14, in each of the luminous flux limit devices 32, 33, 34, 35, and 36, the transmissive region in a diameter direction may have different widths in a main scanning direction X and a sub scanning direction Y.

Figure 10:
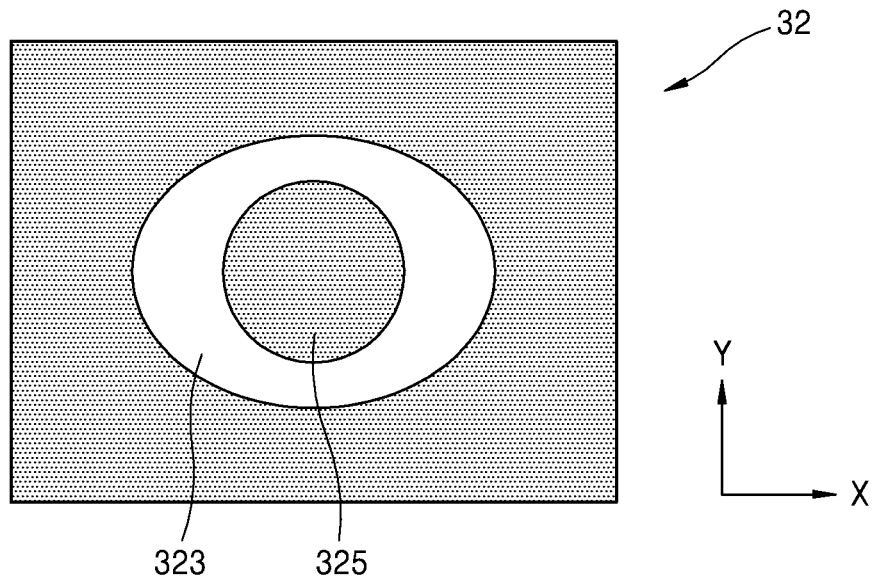
FIG. 10 schematically illustrates a luminous flux limit device according to an embodiment.

For example, as illustrated in FIG. 10, in the luminous flux limit device 32, an outermost shape of a transmissive region 323 may be an oval shape having a major axis in the main scanning direction X, and an outermost shape of the blocking region 325 may be a circular shape.

Figure 11:
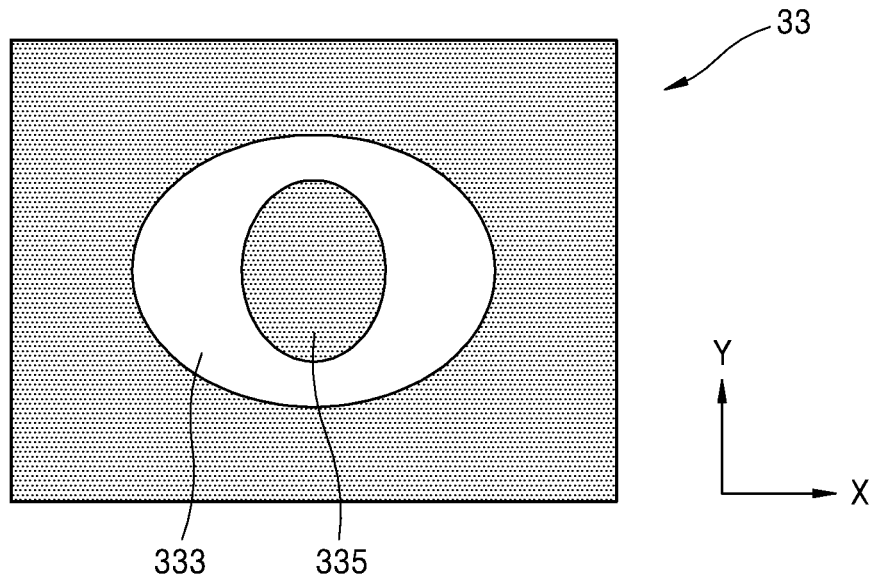
FIG. 11 schematically illustrates a luminous flux limit device according to an embodiment.

As an example, as illustrated in FIG. 11, in the luminous flux limit device 33, an outermost shape of a transmissive region 333 may be an oval shape having a major axis in the main scanning direction X and an outermost shape of the blocking region 335 may be an oval shape having a major axis in the sub scanning direction Y. The outermost shape of the transmissive region 333 may be an oval shape having a major axis in the sub scanning direction Y and the outermost shape of the blocking region 335 may be an oval shape having a major axis in the main scanning direction X. The outermost shapes of the transmissive region 333 and the blocking region 335 may be both an oval shape having a major axis in the main scanning direction X or the sub scanning direction Y or may be oval shapes having different eccentricity.

Figure 12:
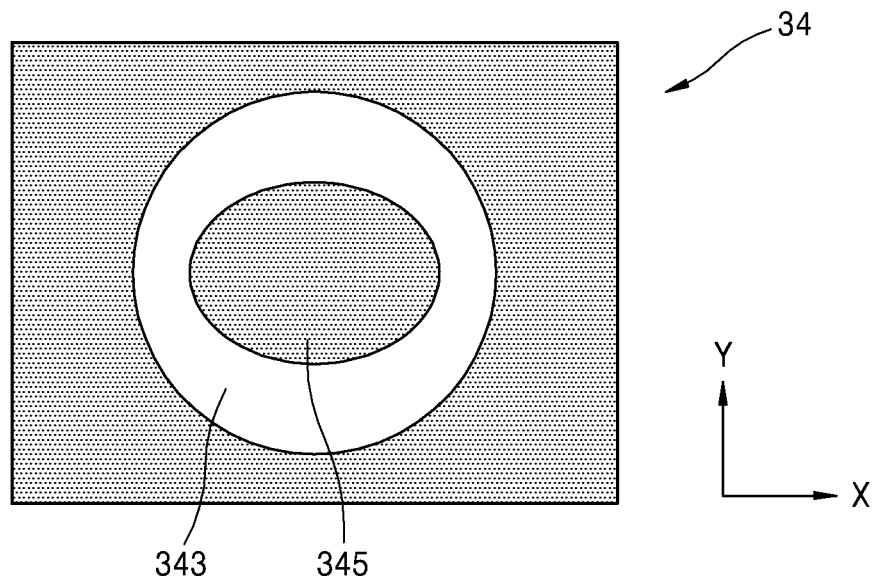
FIG. 12 schematically illustrates a luminous flux limit device according to an embodiment.

As an example, as illustrated in FIG. 12, in the luminous flux limit device 34, an outermost shape of the transmissive region 343 may be a circular shape and an outermost shape of the blocking region 345 may be an oval shape having a major axis in the main scanning direction X.

Figure 13:
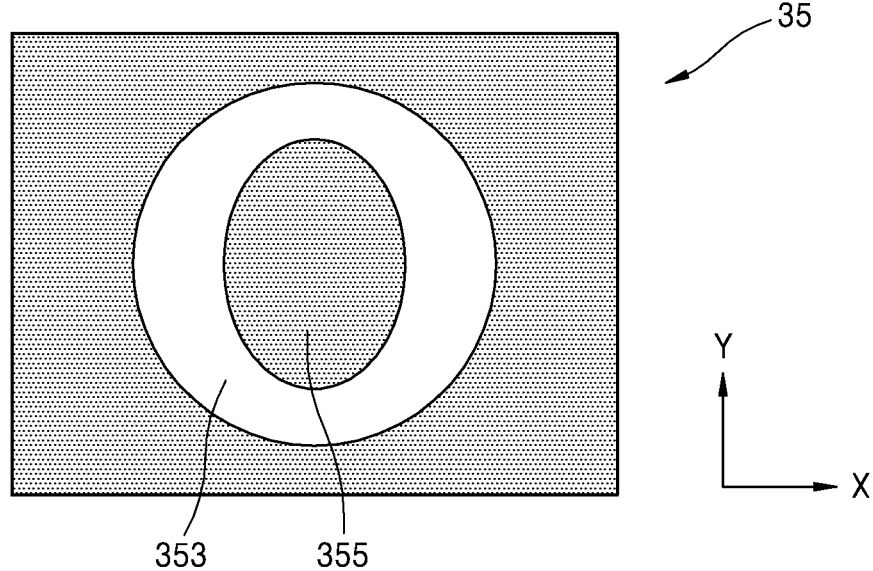
FIG. 13 schematically illustrates a luminous flux limit device according to an embodiment.

As an example, as illustrated in FIG. 13, in the luminous flux limit device 35, an outermost shape of a transmissive region 353 may be a circular shape and an outermost shape of the blocking region 355 may be an oval shape having a major axis in the sub scanning direction Y.

Figure 14:
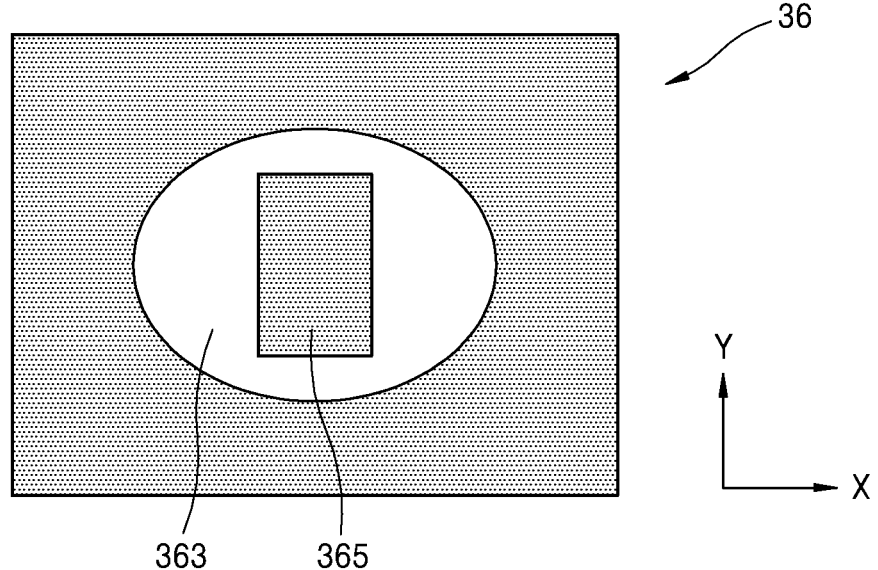
FIG. 14 schematically illustrates a luminous flux limit device according to an embodiment.

As an example, as illustrated in FIG. 14, in the luminous flux limit device 36, an outermost shape of a transmissive region 363 may be an oval shape having a major axis in the main scanning direction X and an outermost shape of the blocking region 365 may be a rectangular shape in the sub scanning direction Y.

The luminous flux limit devices 32, 33, 34, 35, and 36 may be appropriately selected according to required optical characteristics of the optical scanning unit 100.

FIGS. 10 to 14 illustrate exemplary embodiments.

Figure 15:
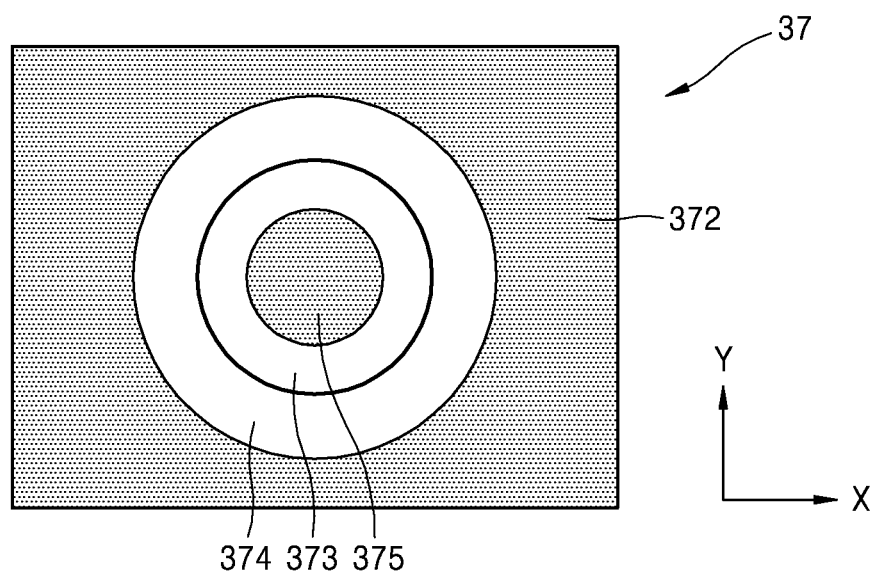
FIG. 15 schematically illustrates a luminous flux limit device according to an embodiment.
Figure 16:
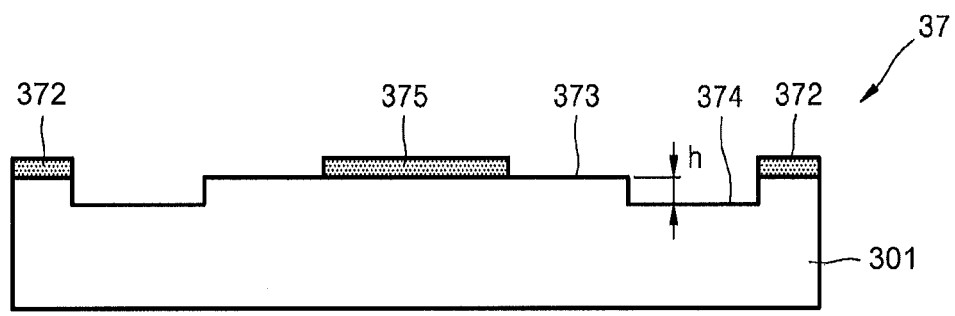
FIG. 16 is a schematic side cross-sectional view of a luminous flux limit device.

FIG. 15 schematically illustrates a luminous flux limit device 37 according to an embodiment. FIG. 16 is a schematic side cross-sectional view of the luminous flux limit device 37 of FIG. 15.

Referring to FIGS. 15 and 16, the luminous flux limit device 37 according to an embodiment is similar to the luminous flux limit devices according to other embodiments except that a first transmissive region 373 and a second transmissive region 374 in which the phases of transmitted luminous fluxes are set to be different may be used. That is, in the luminous flux limit device 37, an aperture may be defined by applying a light-blocking material on an outer region 372 and the light-blocking material is also applied to a blocking region 375 which is a central portion. The first transmissive region 373 and the second transmissive region 374 are placed between the outer region 372 and the blocking region 375. The first transmissive region 373 may surround the blocking region 375 and the second transmissive region 374 may surround the first transmissive region 373.

A phase difference may be set between the phase of the luminous flux passing through the second transmissive region 374 and the phase of the luminous flux passing through the first transmissive region 373. The phase difference may be set between the first and second transmissive regions 373 and 374 to minimize bad influences caused by a side-lobe, a resolution may be prevented from being lowered even when the size of the blocking region 375 decreases to a certain extent, and an optical loss due to the blocking region 375 may be minimized.

The phase difference between the first transmissive region 373 and the second transmissive region 374 may be achieved in various ways. For example, as illustrated in FIG. 16, the difference between heights of the first transmissive region 373 and the second transmissive region 374 may be set to "h" so that the phases of light passing through the first transmissive region 373 and light passing through the second transmissive region 374 may be different. As an example, a material having a refractive index may be applied to one of the first transmissive region 373 and the second transmissive region 374 so that the phases of light passing through the first transmissive region 373 and light passing through the second transmissive region 374 may be different.

The phase difference between the first transmissive region 373 and the second transmissive region 374 may vary according to optical design factors (i.e., desired image-forming depth characteristics, side-lobe characteristics, etc.). For example, the phase difference between the first transmissive region 373 and the second transmissive region 374 may have various values, e.g., $\lambda/2$, $\lambda/4$, $\lambda/8$, etc.

Figure 17:
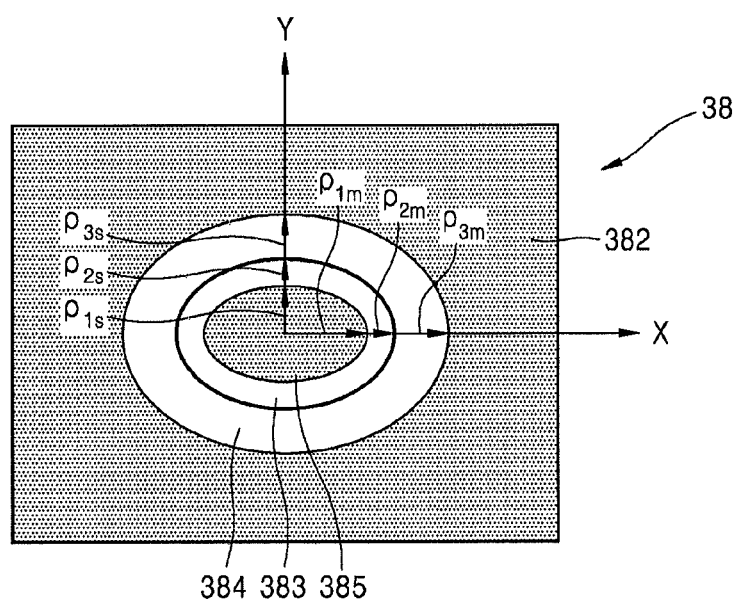
FIG. 17 schematically illustrates a luminous flux limit device according to an embodiment.

FIG. 15 illustrates a case in which outermost shapes of the blocking region 375, the first transmissive region 373, and the second transmissive region 374 are circular shapes but embodiments are not limited thereto. FIG. 17 illustrates a luminous flux limit device 38 according to an embodiment. Referring to FIG. 17, if in the luminous flux limit device 38 according to an embodiment, a radius of an outermost portion of a blocking region 385 in the main scanning direction X is $\rho1m$, a radius of an outermost portion of a first transmissive region 383 in the main scanning direction X is $\rho2m$, and a radius of an outermost portion of a second transmissive region 384 in the main scanning direction X is $\rho3m$, then Equation 4 below may be satisfied.

$$\rho_{1m} < \rho_{2m} < \rho_{3m}, \ 0.3 \le \frac{\rho_{1m}}{\rho_{3m}} \le 0.7, \ 0.5 \le \frac{\rho_{2m}}{\rho_{3m}} \le 0.9 \quad \text{[Equation 4]}$$

If the radius of the outermost portion of the blocking region 385 in the sub scanning direction Y is $\rho_{1s}$, the radius of the outermost portion of the first transmissive region 383 in the sub scanning direction Y is $\rho_{2s}$, and the radius of the outermost portion of the second transmissive region 384 in the sub scanning direction Y is $\rho_{3s}$, then Equation 5 below may be satisfied.

$$\rho_{1s} < \rho_{2s} < \rho_{3s}, 0.3 \leq \frac{\rho_{1s}}{\rho_{3s}} \leq 0.7, 0.5 \leq \frac{\rho_{2s}}{\rho_{3s}} \leq 0.9 \quad \text{[Equation 5]}$$

Different beam spot profiles may be required on an image forming surface in the main scanning direction X and the sub scanning direction Y (e.g., when improved image-forming depth characteristics are required in the sub scanning direction Y and low side-lobe characteristics are required on a beam profile in the main scanning direction X), the radii ρ1m and ρ1s of the blocking region 385 may be different. The radii ρ2m and ρ2s of the first transmissive region 383 may be different. The radii ρ2m and ρ2s of the second transmissive region 384 may be different. That is, as illustrated in FIG. 17, the outermost shapes of the blocking region 383, the first transmissive region 383, and the second transmissive region 384 may be oval shapes. Again, the embodiment of FIG. 17 includes an outer region 382.

Figure 18A:
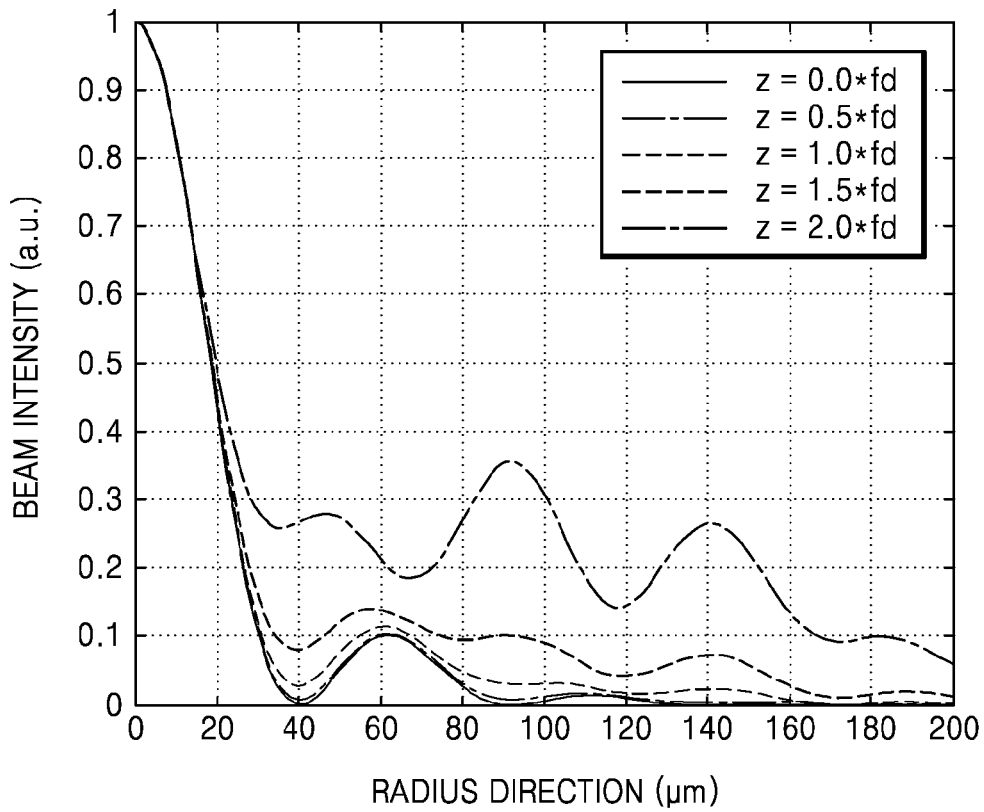
FIGS. 18A to 18C are graphs illustrating an exemplary distribution of light intensities on an image forming surface according to whether phase modulation is performed in luminous flux limit devices according to an embodiment.
Figure 18B:
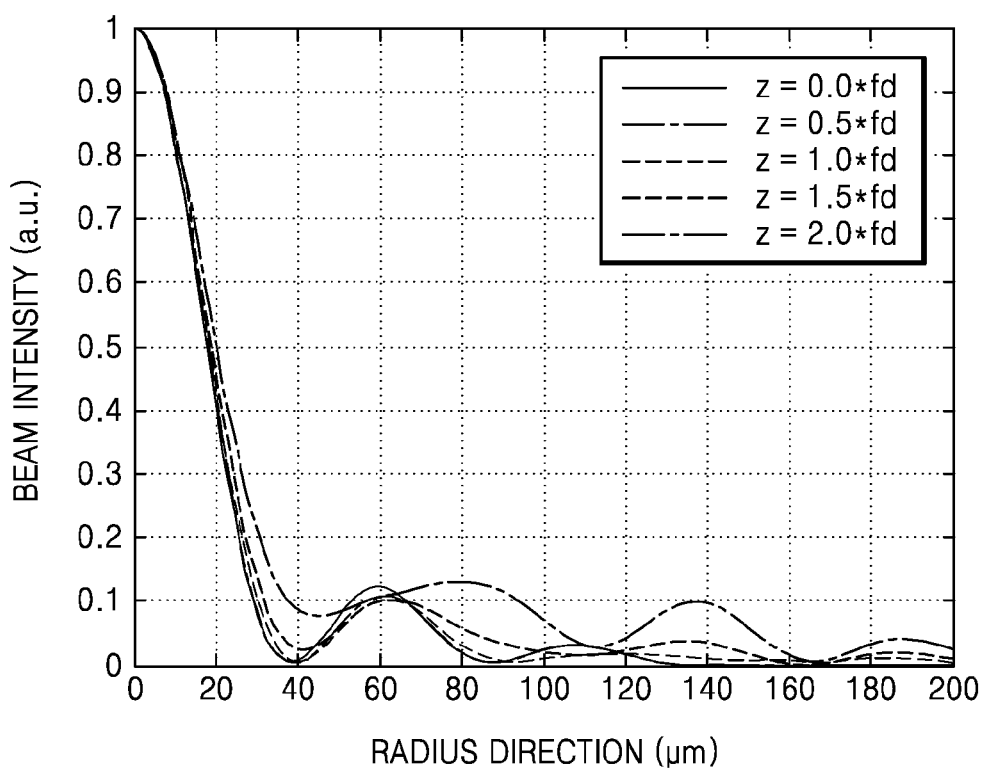
Figure 18C:
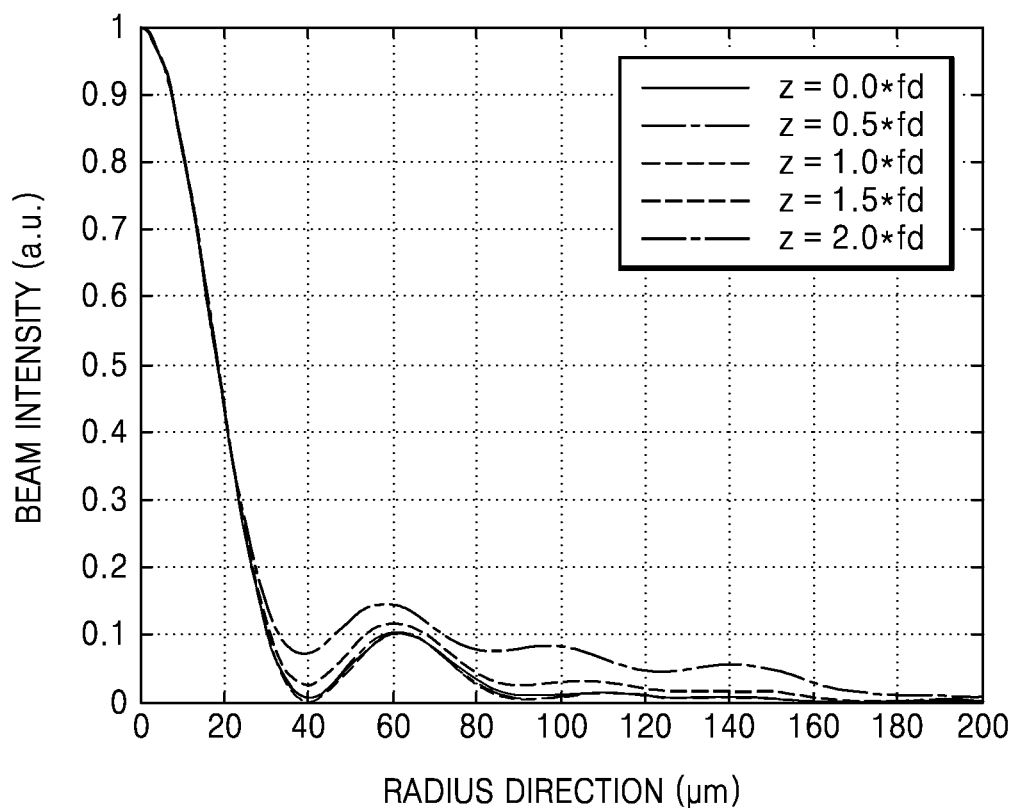

FIGS. 18A to 18C are graphs illustrating an exemplary distribution of light intensities on an image forming surface according to whether phase modulation is performed in luminous flux limit devices according to an embodiment. FIG. 18A is a graph illustrating an exemplary distribution of light intensities when $\rho_{1m}=0.5\rho_m$, $\rho_{2m}=\rho_{3m}=\rho_m$, $\rho_{1m}=0.5\rho_m$, and $\rho_{2m}=\rho_{3m}=\rho_m$ (that is, in the case of simple amplitude modulation in which light is blocked in a region, the radius of which are less than or equal to $0.5\rho_m$ and $0.5\rho_s$ and is allowed to pass through a region, the radius of which are greater than $0.5\rho_m$ and $0.5\rho_s$). The luminous flux limit device may be a luminous flux limit device 31 as illustrated, for example, in FIG. 7.

FIG. 18B is a graph illustrating an exemplary distribution of light intensities when $\rho_{1m}=0.5\rho_m$, $\rho_{2m}=0.7\rho_m$, $\rho_{3m}=\rho_m$, and a phase difference between the first and second transmissive regions 383 and 384 is λ/4 (i.e., when light is blocked in a region, the radius of which are less than or equal to $0.5\rho_m$ and $0.5\rho_s$ and is allowed to pass through a region, the radius of which are greater than $0.5\rho_m$ and $0.5\rho_s$, and phase modulation is performed by λ/4 in a region, the radius of which are equal to or greater than $0.7\rho_m$ and $0.7\rho_s$).

FIG. 18C is a graph illustrating an exemplary distribution of light intensities when $\rho_{1m}=0.5\rho_m$, $\rho_{2m}=0.8\rho_m$, $\rho_{3m}=\rho_m$ and a phase difference between the first and second transmissive regions 383 and 384 is λ/8 (i.e., when light is blocked in a region, the radius of which are less than or equal to $0.5\rho_m$ and $0.5\rho_s$ and is allowed to pass through a region, the radius of which are greater than $0.5\rho_m$ and $0.5\rho_s$, and phase modulation is performed by λ/8 in a region, the radius of which are less than or equal to $0.8\rho_m$ and $0.8\rho_s$).

FIG. 18A illustrates a case in which only simple amplitude modulation is performed by a luminous flux limit device and FIGS. 18B and 18C illustrate cases in which amplitude modulation and phase modulation are performed by the luminous flux limit device.

Referring to FIGS. 18A to 18C, embodiments are illustrated when a beam is focused near an image forming surface (i.e., when z=0.0*fd, z=0.5*fd, or z=1.0*fd). However, if a beam is focused distant from the image forming surface (particularly, if z=2.0*fd), a primary side-lobe increases when simple amplitude modulation is performed. In contrast, even if a beam is focused distant from the image forming surface, the primary side-lobe may be easily suppressed when amplitude modulation and phase modulation are performed. Thus, image-forming depth characteristics are more improved when both amplitude modulation and phase modulation are performed than when simple amplitude modulation is performed.

An embodiment illustrates a case in which a blocking region, a first transmissive region, and a second transmissive region are oval regions but may have a combination of various shapes. For example, a phase difference may be set between the first transmissive region and the second transmissive region by dividing the transmissive region of each of the luminous flux limit devices described above with reference to FIGS. 10 to 14.

Figure 19:
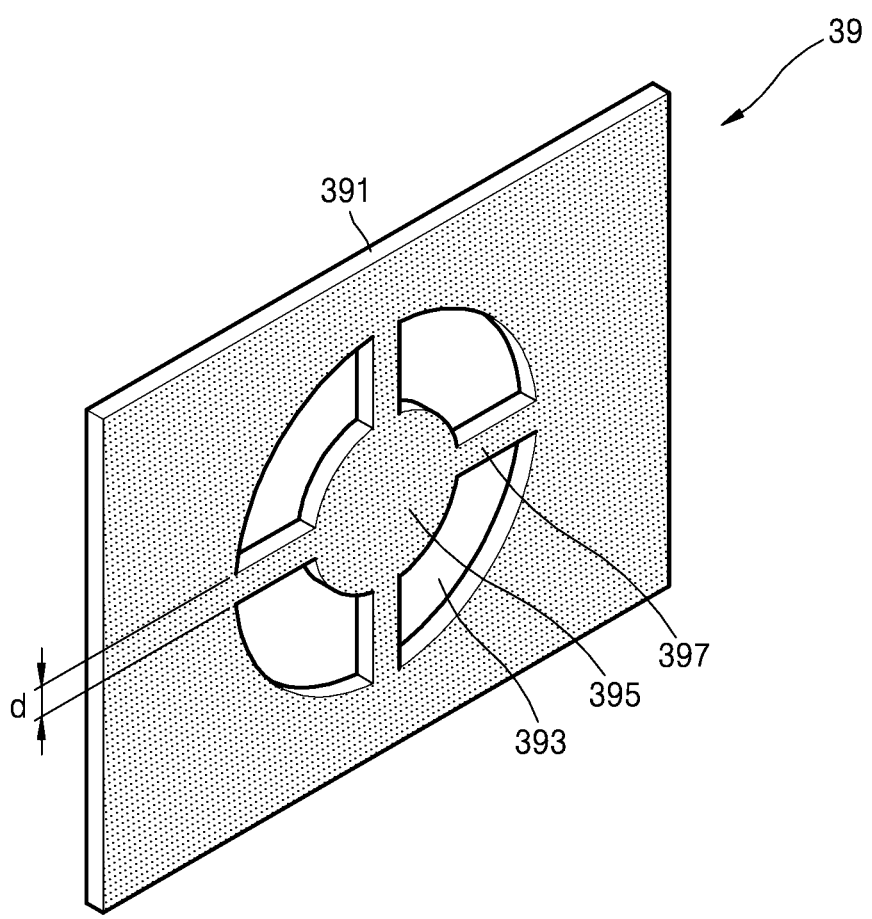
FIG. 19 is a schematic perspective view of a luminous flux limit device according to an embodiment.

FIG. 19 is a schematic perspective view of a luminous flux limit device 39 according to an embodiment. The luminous flux limit device 39 according to an embodiment may be manufactured by forming a transmissive region 393 and a blocking region 395 by perforating a body portion 391 while retaining a central region of the body portion 391. The blocking region 395 which is a light-blocking portion may be supported by a support portion 397 extending from edges of apertures in the body portion 391. The luminous flux limit device 39 may be integrally formed by pressing or injection molding. If a width of the support portion 397 is d and a radius of an outermost portion of the transmissive region is ρ, 0<d/ρ≤0.3 may be satisfied.

Figure 20A:
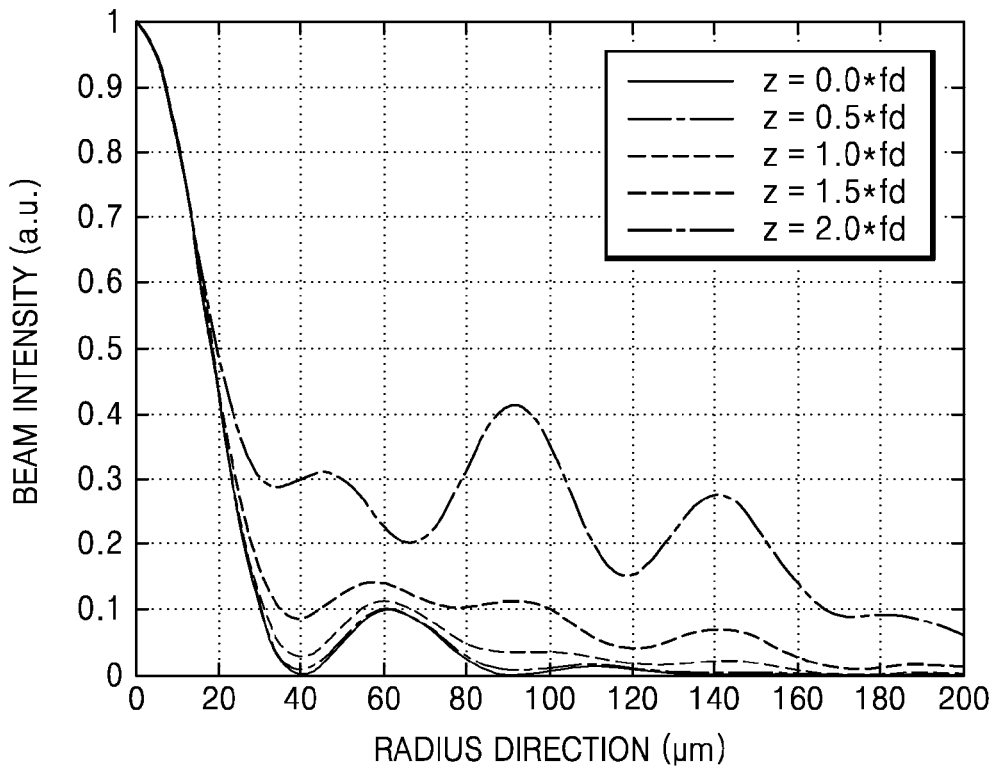
FIGS. 20A to 20C are graphs illustrating exemplary distributions of light intensities on an image forming surface according to the width of a support portion of the luminous flux limit device.
Figure 20B:
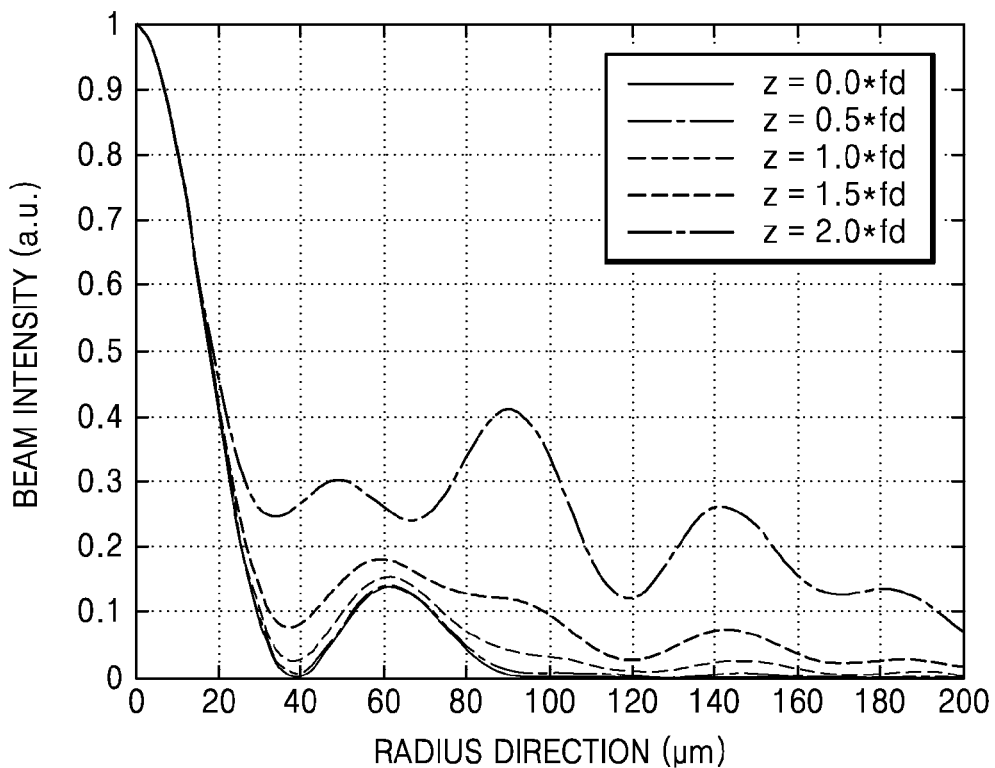
Figure 20C:
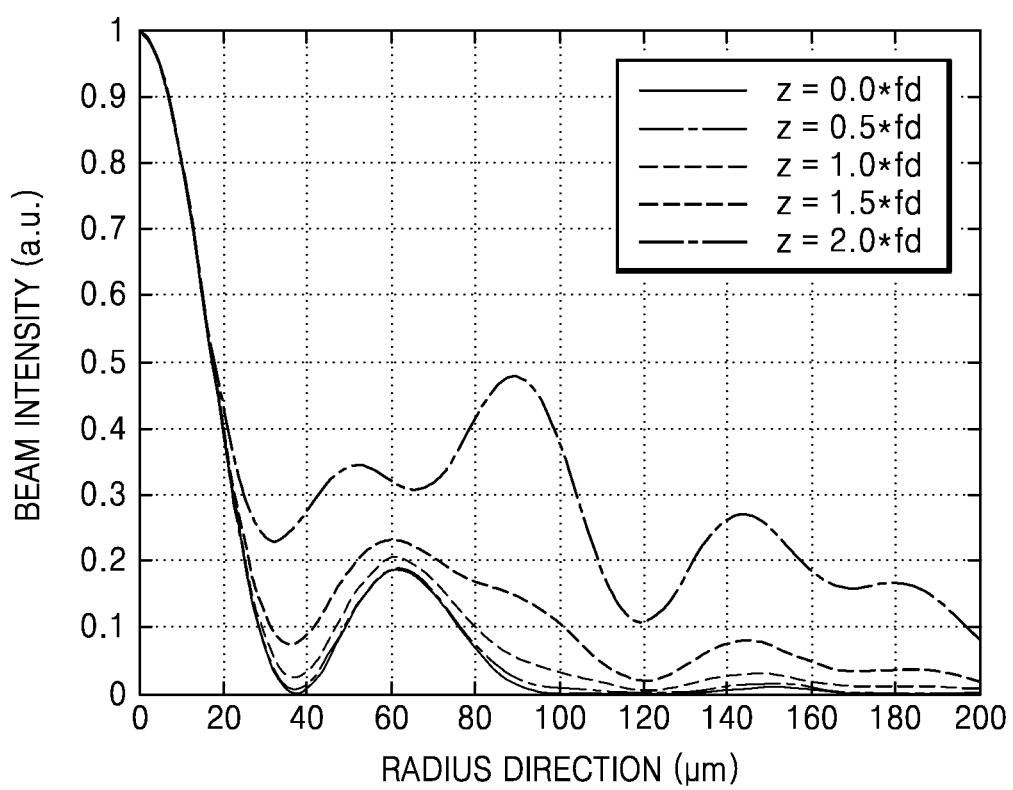

FIGS. 20A to 20C are graphs illustrating exemplary distributions of light intensities on an image forming surface according to the width of the support portion 397 of the luminous flux limit device 39 of FIG. 19. FIGS. 20A to 20C illustrate cases in which a width d of the support portion 397 is 0, 0.1ρ, and 0.2ρ, respectively. FIG. 20A illustrates a case in which no support portion is formed and a luminous flux limit device according to FIG. 20A may correspond to the luminous flux limit device 30 illustrated, for example, in FIG. 2.

Referring to FIGS. 20A to 20C, when the width d of the support portion 397 is 0.1 or 0.2 times the radius ρ of the apertures, optical characteristics that are substantially the same as when no support portion is formed may be achieved.

Figure 21:
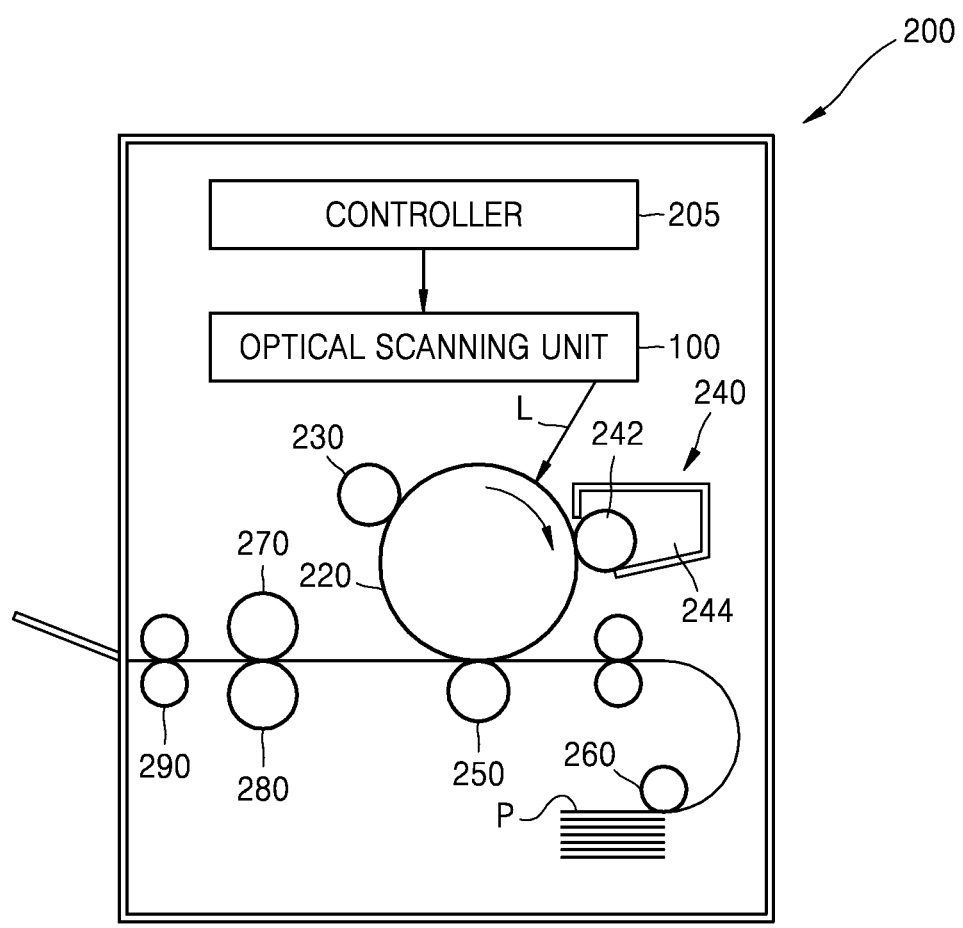
FIG. 21 schematically illustrates an electrophotographic image forming apparatus according to an embodiment.

FIG. 21 schematically illustrates an electrophotographic image forming apparatus 200 according to an embodiment.

The image forming apparatus 200 according to an embodiment includes an optical scanning unit 100, a photosensitive drum 220, and a developing device 240.

The photosensitive drum 220 is an example of an image carrier in which a photosensitive layer is formed to a predetermined thickness on an outer circumferential surface of a metal pipe. Although not illustrated, a photosensitive belt may be the image carrier. The outer circumferential surface of the photosensitive drum 220 may be used as the image-formed region described above in the previous embodiments.

A charging roller 230 may be placed on an upper portion of the outer circumferential surface of the photosensitive drum 220 that is exposed by the optical scanning unit 100. The charging roller 230 is an example of a charger configured to charge a surface of the photosensitive drum 220 with uniform electric potentials while rotating in contact with the photosensitive drum 220. A charging bias is applied to the charging roller 230. A corona charger (not illustrated) may be used instead of the charging roller 230.

The optical scanning unit 200 is controlled by a controller 205, and forms an electrostatic latent image by scanning light L modulated according to image information on the image-formed surface of the photosensitive drum 220 charged with uniform potentials. The optical scanning unit 100 may be an optical scanning unit employing one of the luminous flux limit devices according to an embodiment.

The developing device 240 includes a developing roller 242 and a toner container 244. Toner contained in the toner container 244 may be moved to a developing nip formed when the photosensitive drum 220 and the developing roller 242 contact each other while being attached to a surface of the developing roller 242, and then attached to the electrostatic latent image formed on the photosensitive drum 220 when a developing bias is applied to the developing roller 242. That is, the developing device 240 supplies the toner to the photosensitive drum 220 to form a toner image. The color of the toner image that is to be printed is determined by the color of the supplied toner.

A transfer bias may be applied to a transfer roller 250 disposed to face the photosensitive drum 220. A feed roller 260 moves paper P which is a recording medium to a transfer nip formed when the transfer roller 250 and the photosensitive drum 220 contact each other. The toner image attached to the photosensitive drum 220 is transferred onto the paper P due to an electrostatic force generated from the transfer bias applied to the transfer roller 250. The toner image transferred onto the paper P is fixed onto the paper P when heat and pressure are applied thereto by a fixing roller 270 and a pressure roller 280, respectively, thereby completing printing the toner image. The paper P may be discharged by an exit roller 290.

The electrophotographic image forming apparatus 200 according to an embodiment has been described with respect to a case in which a monochromatic image is formed, but embodiments are not limited thereto. A luminous flux limit device according to an embodiment may be applied to various well-known optical scanning units and electrophotographic image forming apparatuses. For example, a plurality of optical scanning units 100, a plurality of photosensitive drums 220, and a plurality of developing devices 240 may be prepared to correspond to various colors in order to print a color image. The optical scanning units 100 corresponding to the colors may be each substantially the same as the optical scanning unit 100 illustrated in FIG. 1. The optical scanning unit 100 may be capable of scanning four beams on four photosensitive drums, respectively, and shared in the four photosensitive drums and four developing devices.

It should be understood that the exemplary embodiments described therein should be considered in a descriptive sense only and not for purposes of limitation. Descriptions of features or aspects within each embodiment may be available for other similar features or aspects in other embodiments.

While a luminous flux limit device, an optical scanning unit employing the luminous flux limit device, and an electrophotographic image forming apparatus according to one or more embodiments have been described with reference to the figures, it will be understood by those of ordinary skill in the art that various changes in form and details may be made therein without departing from the spirit and scope as defined by the following claims.

What is claimed is:

1. A luminous flux limit device that limits a luminous flux of an optical scanning unit, the luminous flux limit device comprising:
    a body portion including an aperture; and
    a light-blocking portion to prevent light from being transmitted,
    wherein the aperture comprises:
        a blocking region in which light is blocked by the light-blocking portion, and
        a transmissive region which is a region of the aperture excluding the blocking region,
    wherein the transmissive region is a flat continuous region surrounding the blocking region,
    wherein the blocking region is located in a central region of the aperture,
    wherein the transmissive region includes a first transmissive region and a second transmissive region, and the phases of the luminous fluxes of the first transmissive region and the second transmissive region are set to be different,
    wherein the first transmissive region surrounds the blocking region,
    the second transmissive region surrounds the first transmissive region, and
    wherein, if a radius of an outermost portion of the blocking region in a main scanning direction is $\rho_{1m}$, a radius of an outermost portion of the first transmissive region in the main scanning direction is $\rho_{2m}$, and a radius of an outermost portion of the second transmissive region in the main scanning direction is $\rho_{3m}$, then $\rho_{1m}<\rho_{2m}<\rho_{3m}$, $0.3 \leq \rho_{1m}/\rho_{3m} \leq 0.7$, and $0.5 \leq \rho_{2m}/\rho_{3m} \leq 0.9$ are satisfied.

2. The luminous flux limit device of claim 1, wherein, if a radius of an outermost portion of the blocking region in a sub scanning direction is $\rho_{1s}$, a radius of an outermost portion of the first transmissive region in the sub scanning direction is $\rho_{2s}$, and a radius of an outermost portion of the second transmissive region in the sub scanning direction is $\rho_{3s}$, then $\rho_{1s}<\rho_{2s}<\rho_{3s}$, $0.3 \leq \rho_{1s}/\rho_{3s} \leq 0.7$, and $0.5 \leq \rho_{2s}/\rho_{3s} \leq 0.9$ are satisfied.

3. A luminous flux limit device that limits a luminous flux of an optical scanning unit, the luminous flux limit device comprising:
    a body portion including an aperture; and
    a light-blocking portion to prevent light from being transmitted,
    wherein the aperture comprises:
        a blocking region in which light is blocked by the light-blocking portion, and
        a transmissive region which is a region of the aperture excluding the blocking region,
    wherein the transmissive region is a flat continuous region surrounding the blocking region, and
    wherein, if a radius of an outermost portion of the blocking region in a main scanning direction is $\rho_{1m}$, a radius of an outermost portion of the blocking region in a sub scanning direction is $\rho_{1s}$, a radius of an outermost portion of the transmissive region in the main scanning direction is $\rho_{2m}$, and a radius of an outermost portion of the transmissive region in the sub scanning direction is $\rho_{2s}$, then $0.3 \leq \rho_{1m}/\rho_{2m} \leq 0.7$, and $0.3 \leq \rho_{1s}/\rho_{2s} \leq 0.7$ are satisfied.

4. A luminous flux limit device that limits a luminous flux of an optical scanning unit, the luminous flux limit device comprising:
    a body portion including an aperture; and
    a light-blocking portion to prevent light from being transmitted,
    wherein the aperture comprises:
        a blocking region in which light is blocked by the light-blocking portion, and
        a transmissive region which is a region of the aperture excluding the blocking region,
    wherein the transmissive region is a flat continuous region surrounding the blocking region,
    wherein the aperture in the body portion is a hole, and the light-blocking portion is supported by a support portion that is extended from an edge of the aperture, and
    wherein, if a width of the support portion is d and a radius of an outermost portion of the transmissive region is $\rho$, then $0 < d/\rho \leq 0.3$ is satisfied.

5. The luminous flux limit device of claim 4, wherein the body portion and the light-blocking portion are integrally formed.

6. A luminous flux limit device that limits a luminous flux of an optical scanning unit, the luminous flux limit device comprising:
   a body portion;
   a first light-blocking region formed on the body portion to prevent light from being transmitted through the body portion; and
   an aperture formed within the first light-blocking region, wherein the aperture includes—
      a first light transmissive region contiguous with and extending inward from the first light-blocking region,
      a second light transmissive region contiguous with and extending inward from the first light transmissive region, and
      a second light-blocking region contiguous with and extending inwardly from the second light transmissive region,
   wherein each of the first and second light transmissive regions is flat and continuous, and
   wherein phase differences exist between luminous fluxes of the first light transmissive region and the second light transmissive region.

7. The luminous flux limit device of claim 6, wherein the second light-blocking region is located in a central region of the aperture.

8. The luminous flux limit device of claim 6, wherein an outermost shape of the first light transmissive region is one of a circular shape, an oval shape, and a tetragonal shape.

9. The luminous flux limit device according to claim 6, wherein an outermost shape of the second light transmissive region is one of a circular shape, an overall shape and a tetragonal shape.

10. The luminous flux limit device of claim 6, wherein an outermost shape of the second light-blocking region is one of a circular shape, an oval shape, and a tetragonal shape.

11. The luminous flux limit device of claim 6, wherein an outermost shape of the first light-transmissive region, an outermost shape of the second light-transmissive region, and an outermost shape of the second light-blocking region are the same.

12. The luminous flux limit device of claim 6, wherein an outermost shape of the first light transmissive region is a first oval shape,
   an outermost shape of the second light transmissive region is a second oval shape,
   an outermost shape of the second light-blocking region is a third oval shape, and
   a major axis of the first, second and third oval shapes are collinear.

13. The luminous flux limit device of claim 12, wherein a minor axis of the first, second and third ovals are in a sub scanning direction, and the major axis is in a main scanning direction.

14. The luminous flux limit device of claim 12, wherein each of the oval shapes has a different eccentricity.

15. The luminous flux limit device of claim 6, wherein the first and second light transmissive regions and the second light-blocking region are each circular and concentric.

16. The luminous flux limit device of claim 6, wherein at least two among an outermost shape of the second light-blocking region, and outermost shape of the first transmissive region, and an outermost shape of the second transmission region are different from each other.

17. The luminous flux limit device of claim 6, wherein the phase differences are caused by the first and second transmissive regions being recessed to different depths into the body portion so that phases of light passing through the first and second light transmissive regions, respectively, will be different.

18. The luminous flux limit device of claim 6, wherein the phase differences are caused by the first transmissive region having a different refractive index than the second transmissive region so that light passing through the first light transmissive region and light passing through the second light transmissive region are different.

19. The luminous flux limit device of claim 6, wherein the body portion is a transparent substrate, and
   the first and second light-blocking regions are formed on a surface of the transparent substrate.

20. An optical scanning apparatus comprising:
   a light source for emitting light according to an image signal;
   a deflector for deflection-scanning a luminous flux emitted from the light source;
   an incident optical system for causing the luminous flux emitted from the light source to be incident on the deflector; and
   an image forming optical system for imaging the luminous flux deflected by the deflector on an image-formed surface,
   wherein the incident optical system comprises a luminous flux limit device for limiting the luminous flux,
   wherein the luminous flux limit device includes—
      a body portion;
      a first light-blocking region formed on the body portion to prevent light from being transmitted through the body portion; and
      an aperture formed within the first light-blocking region, wherein the aperture includes—
         a first light transmissive region contiguous with and extending inward from the first light-blocking region,
         a second light transmissive region contiguous with and extending inward from the first light transmissive region, and
      a second light-blocking region contiguous with and extending inwardly from the second light transmissive region,
   wherein each of the first and second light transmissive regions is flat and continuous, and
   wherein phase differences exist between luminous fluxes of the first light transmissive region and the second light transmissive region.

21. The optical scanning apparatus of claim 20, wherein the incident optical system further comprises:
   a collimator lens for collimating a luminous flux emitted from the light source into a collimated beam, and
   a cylindrical lens for causing the luminous flux passing through the collimator lens to be focused on a reflecting surface of the deflector in a main scanning direction or a sub scanning direction,
   wherein the luminous flux limit device is disposed in an optical path between the collimator lens and the cylindrical lens.

22. An electrophotographic image forming apparatus comprising:
   an image carrier;
   an optical scanning unit for forming an electrostatic latent image by scanning a light beam on an image-formed surface of the image carrier; and
   a developing device for developing the electrostatic latent image formed on the image carrier by supplying toner to the electrostatic latent image,
   wherein the optical scanning unit comprises:

a light source for emitting light according to an image signal, a deflector for deflection-scanning a luminous flux emitted from the light source, an incident optical system for causing the luminous flux emitted from the light source to be incident on the image-formed surface, and an image forming optical system for imaging the luminous flux deflected by the deflector on an image-formed surface, the incident optical system comprises a luminous flux limit device for limiting the luminous flux, wherein the luminous flux limit device includes—
a body portion;
a first light-blocking region formed on the body portion to prevent light from being transmitted through the body portion; and
an aperture formed within the first light-blocking region, wherein the aperture includes—
a first light transmissive region contiguous with and extending inward from the first light-blocking region,
a second light transmissive region contiguous with and extending inward from the first light transmissive region, and
a second light-blocking region contiguous with and extending inwardly from the second light transmissive region, wherein each of the first and second light transmissive regions is flat and continuous, and wherein phase differences exist between luminous fluxes of the first light transmissive region and the second light transmissive region.

\* \* \* \* \*